United States Patent
Martel et al.

(10) Patent No.: US 11,455,432 B1
(45) Date of Patent: *Sep. 27, 2022

(54) MULTI-USER STORAGE VOLUME ENCRYPTION VIA SECURE PROCESSOR

(71) Applicant: Apple Inc., Cupertino, CA (US)

(72) Inventors: Pierre Olivier Martel, Mountain View, CA (US); Arthur Mesh, San Francisco, CA (US); Wade Benson, San Jose, CA (US)

(73) Assignee: Apple Inc., Cupertino, CA (US)

(*) Notice: Subject to any disclaimer, the term of this patent is extended or adjusted under 35 U.S.C. 154(b) by 181 days.

This patent is subject to a terminal disclaimer.

(21) Appl. No.: 16/895,933

(22) Filed: Jun. 8, 2020

Related U.S. Application Data

(63) Continuation of application No. 15/832,887, filed on Dec. 6, 2017, now Pat. No. 10,691,837.

(60) Provisional application No. 62/514,683, filed on Jun. 2, 2017.

(51) Int. Cl.
| | |
|---|---|
| *G06F 21/78* | (2013.01) |
| *G06F 21/72* | (2013.01) |
| *H04L 9/08* | (2006.01) |
| *H04L 9/14* | (2006.01) |

(52) U.S. Cl.
CPC .............. *G06F 21/78* (2013.01); *G06F 21/72* (2013.01); *H04L 9/0861* (2013.01); *H04L 9/0863* (2013.01); *H04L 9/0891* (2013.01); *H04L 9/0894* (2013.01); *H04L 9/14* (2013.01)

(58) Field of Classification Search
CPC ....... G06F 21/78; G06F 21/72; H04L 9/0861; H04L 9/0863; H04L 9/0891; H04L 9/0894; H04L 9/14
See application file for complete search history.

(56) References Cited

U.S. PATENT DOCUMENTS

| | | | |
|---|---|---|---|
| 5,276,735 A | 1/1994 | Boebert et al. | |
| 7,508,943 B2* | 3/2009 | Widergren | G11B 20/00086 380/239 |
| 8,015,224 B1* | 9/2011 | Chaichanavong | H04L 9/0861 708/254 |
| 8,639,949 B2* | 1/2014 | Van Rijnswou | G06F 21/72 380/263 |
| 8,819,836 B2* | 8/2014 | Stella | G06F 21/577 726/25 |
| 9,565,020 B1* | 2/2017 | Camenisch | H04L 9/0861 |
| 9,767,317 B1* | 9/2017 | Chakrovorthy | G06F 21/74 |
| 10,061,915 B1 | 8/2018 | Roth et al. | |
| 10,691,837 B1 | 6/2020 | Martel et al. | |

(Continued)

*Primary Examiner* — Aravind K Moorthy
(74) *Attorney, Agent, or Firm* — Kilpatrick Townsend & Stockton LLP

(57) ABSTRACT

Embodiments described herein enable multi-user storage volume encryption via a secure enclave processor. One embodiment provides for a computing device comprising a first processor to execute a first operating system having one or more user accounts; a second processor to execute a second operating system, the second processor to receive a first encrypted key from the first processor and decrypt a volume encryption key via a key encryption key derived from the first encrypted key, the first encrypted key derived via the secure enclave without user-provided entropy; and a non-volatile memory controller to access encrypted data within non-volatile memory using the volume encryption key.

20 Claims, 20 Drawing Sheets

(56) References Cited

U.S. PATENT DOCUMENTS

| | | | |
|---|---|---|---|
| 2002/0159598 A1* | 10/2002 | Rubinstein | H04L 9/0869 380/259 |
| 2006/0080518 A1* | 4/2006 | Dellacona | G06F 21/70 711/163 |
| 2006/0080540 A1* | 4/2006 | Arnon | G06F 21/78 713/182 |
| 2009/0169004 A1* | 7/2009 | Widergren | G11B 20/1254 711/115 |
| 2010/0017612 A1 | 1/2010 | Aihara | |
| 2010/0172499 A1* | 7/2010 | Sugiyama | G06F 21/606 380/255 |
| 2011/0022856 A1 | 1/2011 | Ureche et al. | |
| 2011/0314279 A1 | 12/2011 | Ureche et al. | |
| 2013/0145440 A1 | 6/2013 | Adam et al. | |
| 2013/0219507 A1* | 8/2013 | Chang | G06F 21/575 726/26 |
| 2014/0068277 A1 | 3/2014 | Metzger | |
| 2014/0122902 A1* | 5/2014 | Isozaki | G06F 21/78 713/193 |
| 2014/0205099 A1* | 7/2014 | Christodorescu | H04L 9/321 380/278 |
| 2014/0282935 A1 | 9/2014 | Lal et al. | |
| 2014/0372767 A1* | 12/2014 | Green | G06F 21/72 713/189 |
| 2015/0121536 A1 | 4/2015 | Xing et al. | |
| 2015/0281189 A1 | 10/2015 | Nayshtut et al. | |
| 2016/0013939 A1 | 1/2016 | Jun et al. | |
| 2016/0191499 A1* | 6/2016 | Momchilov | H04L 63/0815 713/171 |
| 2016/0380985 A1 | 12/2016 | Chhabra et al. | |
| 2017/0041302 A1* | 2/2017 | Oxford | H04L 9/0861 |
| 2017/0052906 A1 | 2/2017 | Lea | |
| 2017/0052907 A1* | 2/2017 | Price, Jr | H04L 63/04 |
| 2017/0093572 A1 | 3/2017 | Hunt et al. | |
| 2017/0222992 A1* | 8/2017 | Adler | H04L 9/0841 |
| 2017/0250801 A1 | 8/2017 | Chen et al. | |
| 2017/0357817 A1* | 12/2017 | Tamura | H04L 9/14 |
| 2017/0357830 A1 | 12/2017 | Benson et al. | |
| 2017/0359717 A1 | 12/2017 | Adler et al. | |
| 2018/0091298 A1 | 3/2018 | Saurav et al. | |
| 2018/0139044 A1 | 5/2018 | Lange | |
| 2018/0167203 A1 | 6/2018 | Belenko | |
| 2018/0241549 A1 | 8/2018 | An et al. | |
| 2018/0336342 A1 | 11/2018 | Narendra Trivedi et al. | |
| 2019/0207913 A1 | 7/2019 | Hwang et al. | |

\* cited by examiner

1000

```
┌─────────────────────────────────────────────────┐
│ Receive a request within a secure enclave       │
│ processor (SEP) to generate a volume encryption │
│ key (VEK) for a storage volume during system    │
│ provisioning of a computing device              │
│ 1002                                            │
└─────────────────────────────────────────────────┘
                        ↓
┌─────────────────────────────────────────────────┐
│ Generate a VEK for the storage volume and       │
│ encrypt the VEK using a key encryption key KEK  │
│ for storage within the SEP                      │
│ 1004                                            │
└─────────────────────────────────────────────────┘
                        ↓
┌─────────────────────────────────────────────────┐
│ Generate system entropy within the SEP to       │
│ generate a system key                           │
│ 1006                                            │
└─────────────────────────────────────────────────┘
                        ↓
┌─────────────────────────────────────────────────┐
│ Derive a system KEK within the SEP based on the │
│ system entropy to enable decryption of the VEK  │
│ 1008                                            │
└─────────────────────────────────────────────────┘
                        ↓
┌─────────────────────────────────────────────────┐
│ Request storage of an encrypted system KEK on   │
│ the storage device                              │
│ 1010                                            │
└─────────────────────────────────────────────────┘
                        ↓
┌─────────────────────────────────────────────────┐
│ Enable access to encrypted storage volume       │
│ without requiring entry of user credentials     │
│ 1012                                            │
└─────────────────────────────────────────────────┘
```

MULTI-USER STORAGE VOLUME ENCRYPTION VIA SECURE PROCESSOR

CROSS-REFERENCE

This application is a continuation of U.S. patent application Ser. No. 15/832,887, filed Dec. 6, 2017 and issued as Ser. No. 10,691,837, which claims priority to U.S. Provisional Patent Application No. 62/514,683 filed Jun. 2, 2017, which is hereby incorporated herein by reference.

BACKGROUND OF THE DISCLOSURE

Computing devices can employ passcode protection to protect data stored on the device. The computing device can prevent unauthorized access to stored data using protection mechanisms in including presenting a login screen that requires a user to provide a user name/password combination and/or a numeric or alphanumeric passcode. Before a user can obtain access to data stored on the computing device, the user may be required successfully authenticate via the login screen. However, it may still be possible to gain access to data stored on the computing system without knowledge of a username/password or passcode if the data is stored in an unencrypted manner. A malicious attacker may be able to extract data directly from the memory. If the attacker has physical access to the computing system, the attacker can remove one or more storage devices from the system and access those devices via a different system.

Computing device passcodes can be used to enable data encryption by providing entropy to an encryption algorithm that enables the generation of one or more per-user keys that may then be used secure data within the computing system. The per-user keys can be combined with system or group keys to provide enable multi-layer encryption of data and encryption keys to defend against data that is accessed outside of the normal login process, for example, via physical access to a storage device.

Notwithstanding various data protection techniques implemented in computing systems known in the art, cryptographic and cryptanalysis techniques continuously evolve. Accordingly, updated techniques of computing device security are regularly developed.

SUMMARY OF THE DESCRIPTION

Embodiments described herein enable multi-user storage volume encryption via a secure enclave processor. One embodiment provides for a computing device comprising a first processor to execute a first operating system having one or more user accounts; a second processor to execute a second operating system, the second processor including a secure enclave, the secure enclave to receive a first encrypted key from the first processor and decrypt a volume encryption key via a key encryption key derived from the first encrypted key, the first encrypted key derived via the secure enclave without user-provided entropy; and a non-volatile memory controller to access encrypted data within non-volatile memory using the volume encryption key.

One embodiment provides for a non-transitory machine-readable medium storing instructions to cause one or more processors to perform operations including generating a volume encryption key within a secure enclave processor, the volume encryption key to enable access to data on a storage volume of a data processing system; encrypting the volume encryption key within the secure enclave processor, the volume encryption key encrypted using a first encryption key; generating first system entropy data within the secure enclave processor; generating a second encryption key based on the first system entropy data, the second encryption key to enable access to the first encryption key; and requesting storage of an encrypted second encryption key within a storage device on the data processing system, the encrypted second encryption key to enable access to the volume encryption key by a user account without use of entropy associated with credentials of the user account.

One embodiment provides for a data processing system comprising a first set of processors to execute a first set of instructions, the first set of instructions to cause the first set of processors to provide a first operating system, the first operating system having multiple user accounts; a second set of processors to execute a second set of instructions, the second set of processors including a secure enclave processor, the secure enclave processor to receive a first encrypted key from the first set of processors and decrypt a volume encryption key via a key encryption key derived from the first encrypted key, the first encrypted key derived via the secure enclave processor without user-provided entropy; and a non-volatile memory controller to access encrypted data within non-volatile memory using the volume encryption key.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which:

FIGS. 10A-10B illustrate operations associated with logic to enable and manage default storage volume encryption, according to embodiments described herein;

DETAILED DESCRIPTION

Figure 1:
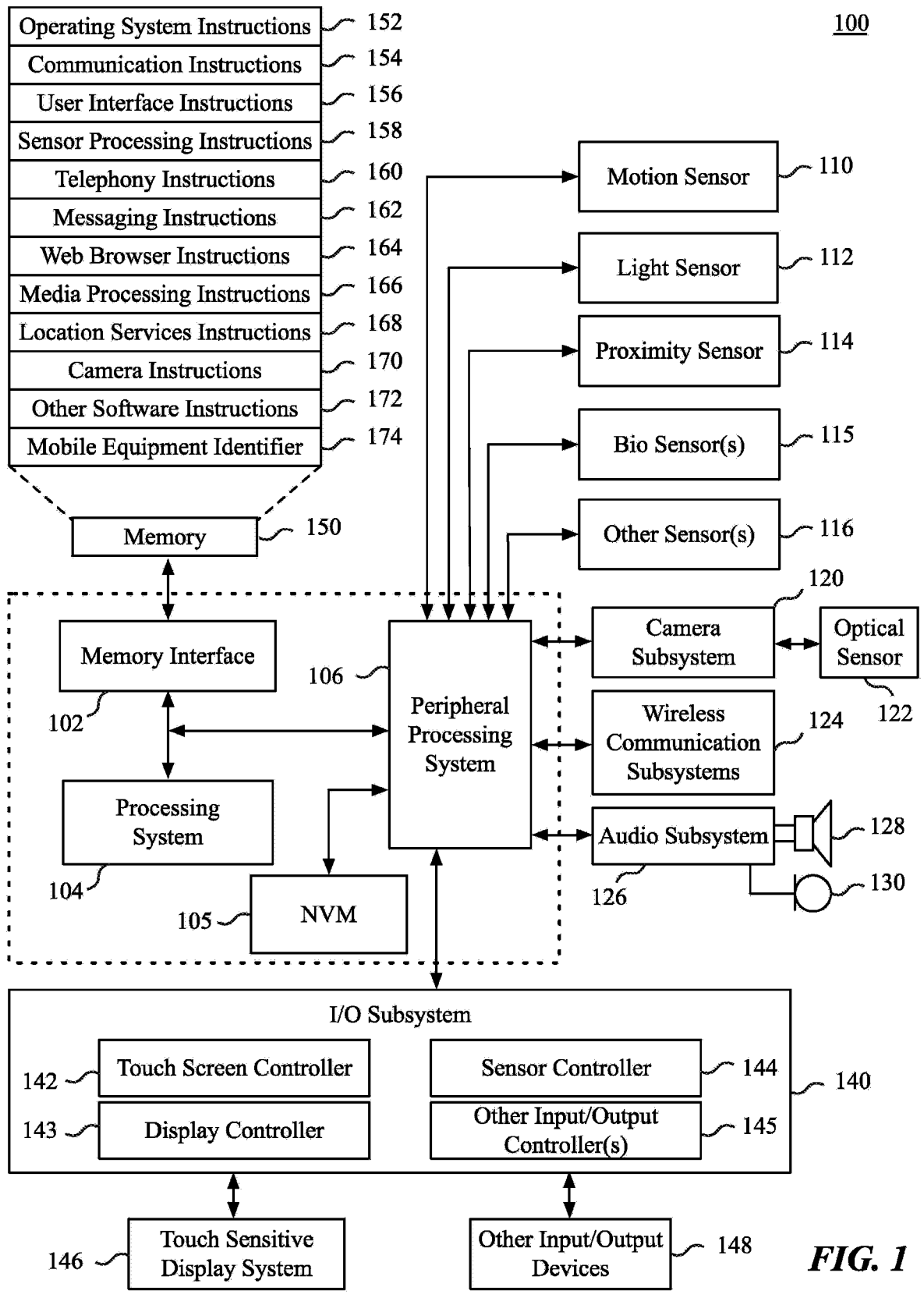
FIG. 1 is a block diagram of a computing device architecture, according to an embodiment.

Embodiments described herein provide for a system, method, and apparatus to enable secured passcodes and encryption on a data processing system. Passcode throttling can be enabled some single-user mobile computing devices, such as smartphone or tablet computing devices, to limit the rate in which an unauthorized user can attempt to enter incorrect passcodes. The mobile computing device can be configured to auto-disable and block additional authorization attempts after a maximum number of incorrect passcodes have been entered. As an additional technique, the rate of passcode entry can be throttled after a pre-determined number of incorrect authentication attempts. Throttling the rate of incorrect attempts provides various benefits, including limiting the likelihood in which an accidental lockout occurs and frustrating the ability to of a malicious attacker to perform a brute-force passcode attack.

In some embodiments, passcode entry rate limiting is enabled for multi-user computing devices such as desktop and laptop computers. Passcode entry rate limiting can be enabled such that the rate of incorrect access attempts to a device can be throttled on a per-user basis. In one embodiment, for multi-user computing devices having multiple access methods (e.g., console login, remote login, remote storage access, remote command line access, etc.), incorrect access attempts may be throttled on a per-access method basis. Such techniques balance security and convenience by limiting the ability for a malicious attacker to perform a brute-force password or passcode attack on a computing device while also limiting the ability of the malicious attacker to leverage the password/passcode throttling technique as a method to deny access to legitimate users.

Additionally, both single user mobile computing devices and multi-user laptop and desktop computing devices can enable enhanced data security via encryption. A computing device can employ several passcodes and associated encryption keys, where multiple passcodes or encryptions keys may be associated with each different user account on the system. For example, when explicit storage volume encryption is enabled on a computing device with a plurality of user accounts, separate keys can be generated for each account to enable the account to access to the computing device's file system and/or applications. Specific portions of the device's file system may be secured by these keys or the entire device storage volume can be secured. Additionally, specific applications can be encrypted, such that the application requires the use of keys to execute and/or to enable access to specific functions. In some implementations, the file system and individual applications require separate keys, where the separate keys differ among user accounts. In such implementations, the passcodes associated with the user accounts can provide entropy that is used to generate the encryption keys associated with the accounts.

In some embodiments, data security for a multi-user computing system can be further enhanced by enabling data encryption by default, without requiring user-based entropy for the generation of encryption keys. In such embodiment, when a user does not enable explicit per-user encryption of data within the computing system, the computing system can generate a set of device specific keys to use to encrypt storage devices on the computing system. In one embodiment, during initial system provisioning, a volume encryption key can be generated to encrypt and decrypt a storage volume on the computing system with requiring user entropy to generate those keys. The system can generate encryption keys and encrypt storage volumes by default in a manner that is transparent to the users of the data processing system. Volume encryption keys can then be protected via key encryption keys. When default system managed encryption is enabled, all data accesses to system storage devices are automatically encrypted and decrypted by a cryptographic engine within the non-volatile memory controller. In one embodiment encryption and decryption is performed transparently to the operating system, and the storage volume may appear "unencrypted" to the host operating system. As the system can automatically unlock the storage volume pre-boot without requiring the user to enter login credentials, a pre-OS login screen to collect user credentials to unlock the storage volume is not required.

To enable multi-user access to the data processing system, group keys can be created, such that via membership within a group on the system (e.g., administrators, users, etc.) can enable different levels of access to the system. When group encryption is enabled, adding a new member to a group may require authorization to be explicitly provided by an existing member of the group. In one embodiment, the system can be transitioned from the default encryption mode unto an explicit encryption mode, in which a set of per-user keys are generated for each user based on per-user entropy. The transition between user-based protection and system-based protection can be performed in a secure and non-replayable manner, such that an adversary having access to system-based decryption keys cannot reuse those keys once the system is transitioned to per-user encryption. In one embodiment, the encryption system can be configured such that a user can explicitly select the storage partitions or storage volumes that may be automatically locked or unlocked without user entropy (e.g., without use of an encryption key generated based on a user passcode), such that, for example, an automatic login can be enabled in which the system boot partition keychain is protected via system managed encryption, while one or more additional partitions on the system are protected via user entropy and can require a user-provided passcode to unlock those partitions.

In some embodiments the techniques described herein are enabled via the use of a peripheral processor or processing system that is separate from the system processors that execute the host operating system. The peripheral processor or processing system, in one embodiment, is a system on a chip (SoC) integrated circuit that enables various secure peripheral and input/output (I/O) operations. In addition to enabling secure access to system peripherals and storage devices, the peripheral processor can include a secure enclave processor (SEP) that facilitates hardened security techniques for the computing system. The SEP provides cryptographic operations for data protection key management and can maintain the integrity of data protection even if the system kernel has been compromised. Communication between the SEP and the main system processors is performed in an isolated manner via an interrupt-driven mailbox and shared memory data buffers and the system processor cannot gain direct access to resources within the SEP.

In one embodiment, the SEP can be configured to be the primary arbiter of all data access on the system. Storage chips having encrypted data cannot be decrypted without the keys stored within the specific SEP used to encrypt the data. For example, the cryptographic engine in the non-volatile memory controllers of the system will not be able to decrypt data on the storage volumes without the use one or more device-specific encryption keys that are stored only within the SEP. Authentication verifiers within the system may be bound to the SEP within the system and the authentication system may be configured to be non-functional if those verifiers are brought offline. Accordingly, the SEP can be used to prevent cryptanalysis of encrypted non-volatile memory that has been removed from a specific computing device for offline analysis.

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

The processes and operations depicted in the figures that follow can be performed via processing logic that includes hardware (e.g. circuitry, dedicated logic, etc.), software (as instructions on a non-transitory machine-readable storage medium), or a combination of both hardware and software. Although some of the processes are described below in terms of sequential operations, it should be appreciated that some of the operations described may be performed in a different order. Moreover, some operations may be performed in parallel rather than sequentially. Additionally, some operations may be indicated as optional and are not performed by all embodiments.

Exemplary Computing Device Architecture

FIG. 1 is a block diagram of a computing device architecture 100, according to an embodiment. The computing device architecture 100 includes a memory interface 102, a processing system 104, and a peripheral processing system 106. The peripheral processing system 106 can implement secure peripheral access and system authentication according to embodiments described herein. The various components can be coupled by one or more communication buses, fabrics, or signal lines. The various components can be separate logical components or devices or can be integrated in one or more integrated circuits, such as in a system on a chip integrated circuit. The processing system 104 may include multiple processors and/or co-processors. The various processors within the processing system 104 can be similar in architecture or the processing system 104 can be a heterogeneous processing system. In one embodiment the processing system 104 is a heterogeneous processing system including one or more data processors, image processors and/or graphics processing units.

The memory interface 102 can be coupled to memory 150, which can include high-speed random access memory such as static random access memory (SRAM) or dynamic random access memory (DRAM). The memory can store runtime information, data, and/or instructions are persistently stored in non-volatile memory 105, such as but not limited to flash memory (e.g., NAND flash, NOR flash, etc.). Additionally, at least a portion of the memory 150 is non-volatile memory. The connection between the processing system 104 and memory 150 to the non-volatile memory 105 can be facilitated via the peripheral processing system 106.

Sensors, devices, and subsystems can be coupled to the peripheral processing system 106 to facilitate multiple functionalities. For example, a motion sensor 110, a light sensor 112, and a proximity sensor 114 can be coupled to the peripheral processing system 106 to facilitate the mobile device functionality. Other sensors 116 can also be connected to the peripheral processing system 106, such as a positioning system (e.g., GPS receiver), a temperature sensor, a biometric sensor, or other sensing device, to facilitate related functionalities. A camera subsystem 120 and an optical sensor 122, e.g., a charged coupled device (CCD) or a complementary metal-oxide semiconductor (CMOS) optical sensor, can be utilized to facilitate camera functions, such as recording photographs and video clips.

The peripheral processing system 106 can enable a connection to communication peripherals including one or more wireless communication subsystems 124, which can include radio frequency receivers and transmitters and/or optical (e.g., infrared) receivers and transmitters. The specific design and implementation of the wireless communication subsystems 124 can depend on the communication network (s) over which a mobile device is intended to operate. For example, a mobile device including the illustrated computing device architecture 100 can include wireless communication subsystems 124 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 124 can provide a communications mechanism over which a client browser application can retrieve resources from a remote web server. The peripheral processing system 106 can also enable an interconnect to an audio subsystem 126, which can be coupled to a speaker 128 and a microphone 130 to facilitate voice-enabled functions, such as voice recognition, voice replication, digital recording, and telephony functions.

The peripheral processing system 106 can enable a connection to an I/O subsystem 140 that includes a touch screen controller 142 and/or other input controller(s) 145. The touch screen controller 142 can be coupled to a touch sensitive display system 146 (e.g., touch-screen). The touch sensitive display system 146 and touch screen controller 142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 146. Display output for the touch sensitive display system 146 can be generated by a display controller 143. In one embodiment, the display controller 143 can provide frame data to the touch sensitive display system 146 at a variable frame rate.

In one embodiment, a sensor controller 144 is included to monitor, control, and/or processes data received from one or more of the motion sensor 110, light sensor 112, proximity sensor 114, or other sensors 116. The sensor controller 144 can include logic to interpret sensor data to determine the occurrence of one of more motion events or activities by analysis of the sensor data from the sensors.

In one embodiment, the peripheral processing system 106 can also enable a connection to one or more bio sensor(s)

115. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 115 can include a finger print sensor that captures fingerprint data from the user. In another embodiment, bio sensor(s) 115 include a camera that captures facial information from a user's face. In some embodiments, the bio sensor(s) 115 can maintain previously captured biometric data of an authorized user and compare the captured biometric data against newly received biometric data to authenticate a user.

In one embodiment, the I/O subsystem 140 includes other input controller(s) 145 that can be coupled to other input/control devices 148, such as one or more buttons, rocker switches, thumb-wheel, infrared port, USB port, and/or a pointer device such as a stylus, or control devices such as an up/down button for volume control of the speaker 128 and/or the microphone 130.

In one embodiment, the memory 150 coupled to the memory interface 102 can store instructions for an operating system 152, including portable operating system interface (POSIX) compliant and non-compliant operating system or an embedded operating system. The operating system 152 may include instructions for handling basic system services and for performing hardware dependent tasks. In some implementations, the operating system 152 can be a kernel or micro-kernel based operating system.

The memory 150 can also store communication instructions 154 to facilitate communicating with one or more additional devices, one or more computers and/or one or more servers, for example, to retrieve web resources from remote web servers. The memory 150 can also include user interface instructions 156, including graphical user interface instructions to facilitate graphic user interface processing.

Additionally, the memory 150 can store sensor processing instructions 158 to facilitate sensor-related processing and functions; telephony instructions 160 to facilitate telephone-related processes and functions; messaging instructions 162 to facilitate electronic-messaging related processes and functions; web browser instructions 164 to facilitate web browsing-related processes and functions; media processing instructions 166 to facilitate media processing-related processes and functions; location services instructions including GPS and/or navigation instructions 168 and Wi-Fi based location instructions to facilitate location based functionality; camera instructions 170 to facilitate camera-related processes and functions; and/or other software instructions 172 to facilitate other processes and functions, e.g., security processes and functions, and processes and functions related to the systems. The memory 150 may also store other software instructions such as web video instructions to facilitate web video-related processes and functions; and/or web shopping instructions to facilitate web shopping-related processes and functions. In some implementations, the media processing instructions 166 are divided into audio processing instructions and video processing instructions to facilitate audio processing-related processes and functions and video processing-related processes and functions, respectively. A mobile equipment identifier, such as an International Mobile Equipment Identity (IMEI) 174 or a similar hardware identifier can also be stored in memory 150.

Each of the above identified instructions and applications can correspond to a set of instructions for performing one or more functions described above. These instructions need not be implemented as separate software programs, procedures, or modules. The memory 150 can include additional instructions or fewer instructions. Furthermore, various functions may be implemented in hardware and/or in software, including in one or more signal processing and/or application specific integrated circuits.

Figure 2:
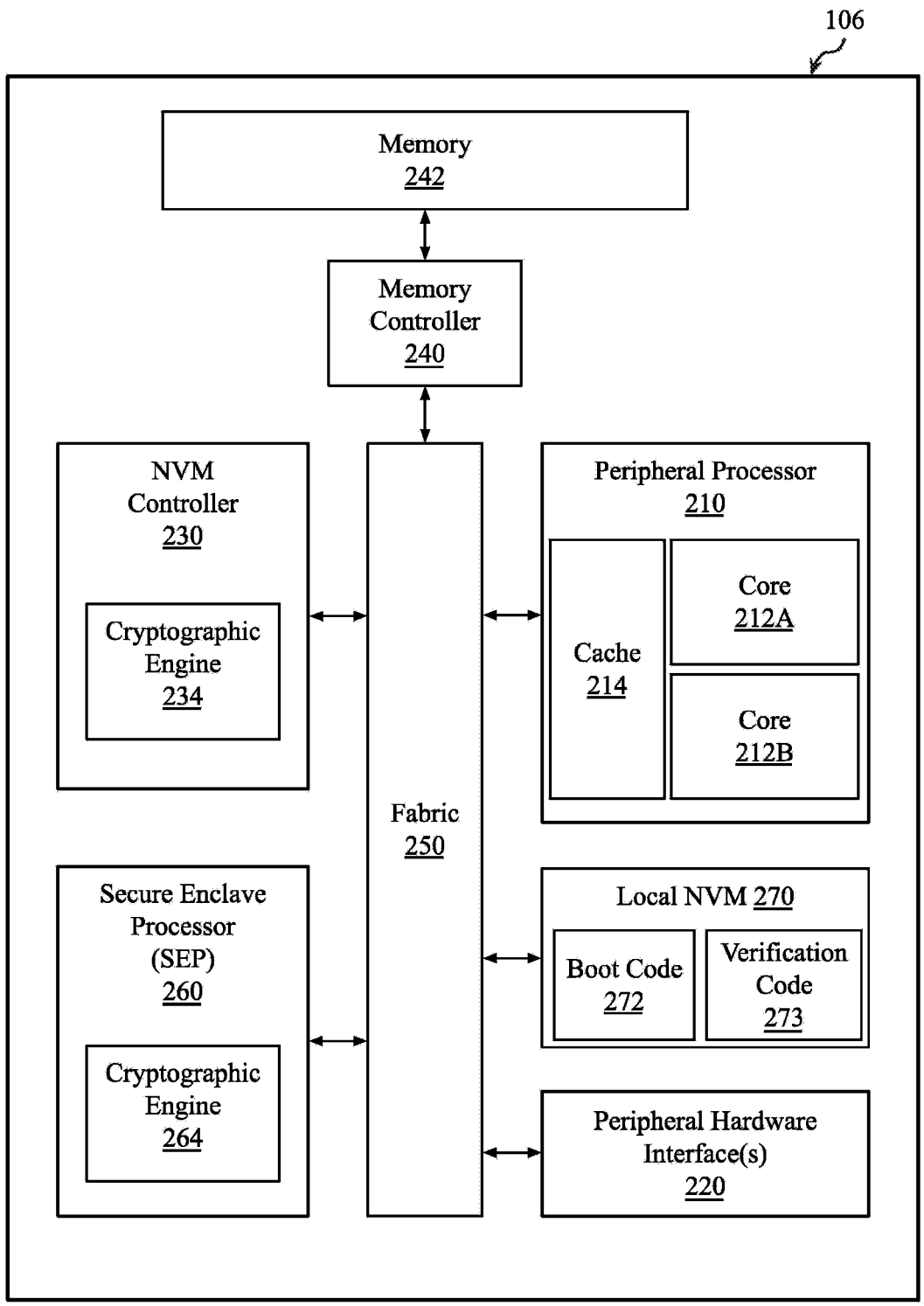
FIG. 2 is a block diagram of the peripheral processing system, according to an embodiment.

FIG. 2 is a block diagram of the peripheral processing system 106, according to an embodiment. In one embodiment, the peripheral processing system 106 is a system on a chip integrated circuit that includes a peripheral processor 210 that facilitates an interface to the various system peripherals via one or more peripheral hardware interface(s) 220. In one embodiment, the peripheral processing system 106 includes a crossbar fabric that enables communication within the system, although a system bus may also be used in other embodiments.

In one embodiment, the peripheral processor 210 includes multiple cores 212A-212B and at least one cache 214. The peripheral processor 210 can facilitate secure access to various peripherals described herein, including enabling secure access to camera, keyboard, or microphone peripherals to prevent an attacker from gaining malicious access to those peripherals. The peripheral processor 210 can then securely boot a separate and complete operating system that is distinct from the operating system that executes via the host processing system (e.g., processing system 104). The peripheral processor 210 can then facilitate the execution of peripheral control firmware that can be loaded from local non-volatile memory 270 connected with the processor via the fabric 250. The peripheral firmware can be securely loaded into the memory 242 via a fabric-attached memory controller, enabling the peripheral processor 210 to perform peripheral node functionality for the peripherals attached via the peripheral hardware interface(s) 220. In one embodiment, the peripheral firmware can also be included within or associated with secure boot code 272. The secure boot code 272 can be accompanied by verification code 273 that can be used verify that the boot code 272 has not been modified.

The peripheral processing system 106 also includes a secure enclave processor (SEP) 260, which is a secure circuit configured to maintain user keys for encrypting and decrypting data keys associated with a user. As used herein, the term "secure circuit" refers to a circuit that protects an isolated, internal resource from being directly accessed by any external circuits. The SEP 260 can be used to secure communication with the peripherals connected via the peripheral hardware interface(s) 220. The SEP 260 can include a cryptographic engine 264 that includes circuitry to perform cryptographic operations for the SEP 260. The cryptographic operations can include the encryption and decryption of data keys that are used to perform storage volume encryption or other data encryption operations within a system.

The peripheral processing system 106 can also include a non-volatile memory controller 230 that controls access to data storage within a system, such as, for example, the non-volatile memory 105 of FIG. 1. The non-volatile memory controller 230 can also include a cryptographic engine 234 to enable compressed data storage within the non-volatile memory. The cryptographic engine 234 can work in concert with the cryptographic engine 264 within the SEP 260 to enable high-speed and secure encryption and decryption of data stored in non-volatile memory. The cryptographic engine 234 in the NVM controller 230 and the cryptographic engine 264 in the SEP may each implement any suitable encryption algorithm such as the Data Encryption Standard (DES), Advanced Encryption Standard (AES), Rivest Shamir Adleman (RSA), or Elliptic Curve Cryptography (ECC) based encryption algorithms.

Figure 3:
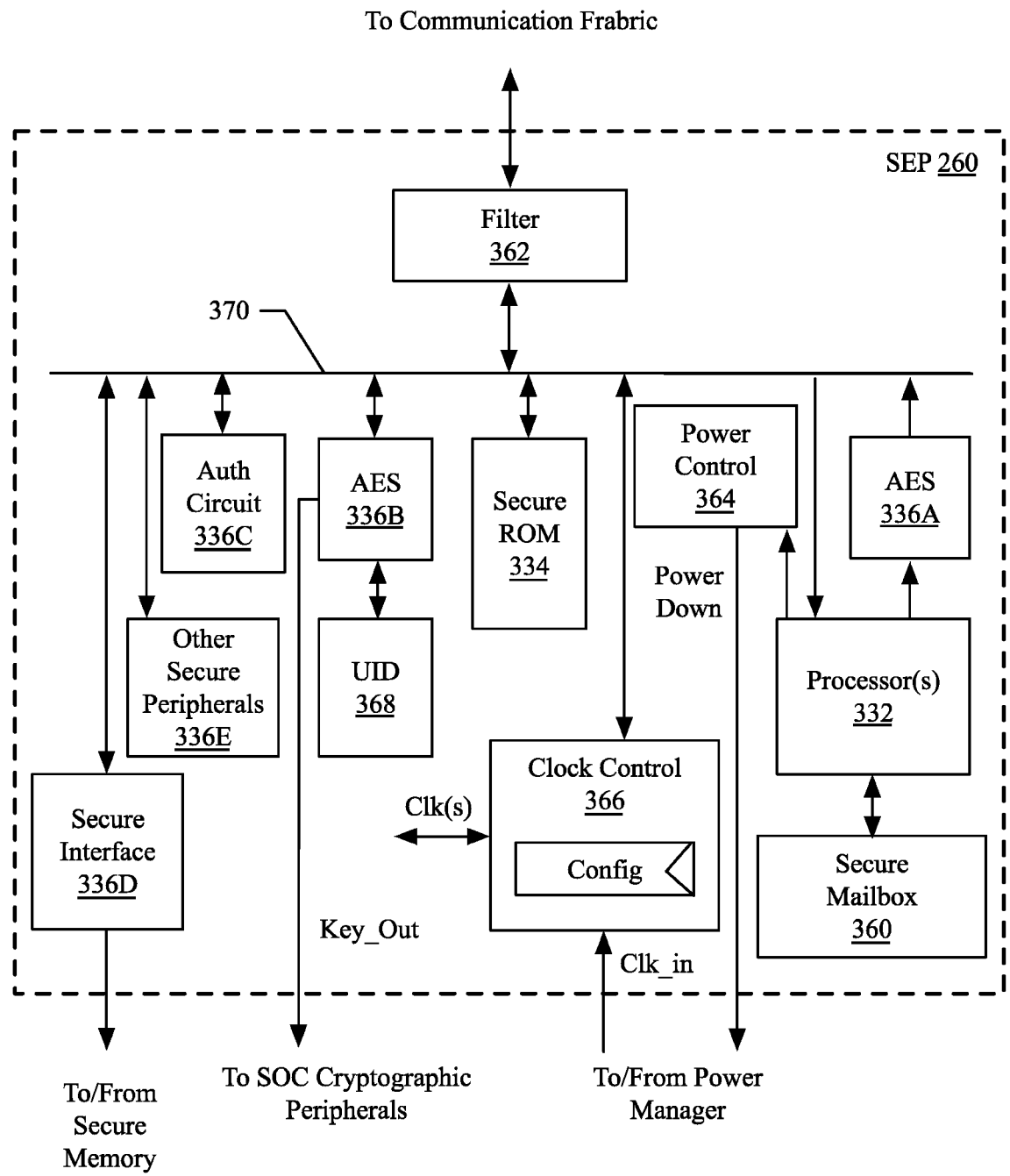
FIG. 3 is block diagram illustrating a secure enclave processor, according to an embodiment.

FIG. 3 is block diagram illustrating a secure enclave processor 260, according to an embodiment. In the illustrated embodiment, the SEP 260 includes the SEP core processor(s) 332, security peripherals 336A-336E, the secure ROM 334, secure mailbox 360, filter 362, power control unit 364, clock control unit 366, and a unique identifier (UID) 368. The filter 362 may be coupled to the communication fabric 250 of FIG. 2 and to a local interconnect 370 to which the other components of the SEP 260 are also coupled. The local interconnect 370 can be configured as a bus-based interconnect or another interconnect such as a packet-based, hierarchical, point-to-point, or cross bar fabric. In one embodiment, the security peripherals 336A-336E coupled with the local interconnect 370 include a set of AES encryption engines 336A-336B, an authentication circuit 336C, a secure interface unit 336D, and other secure peripherals 336E.

In one embodiment, a first AES encryption engine 336A can couple to the SEP core processor(s) 332. The processor (s) 332 are one or more processor cores that manage operations within the SEP. The processor(s) 332 can execute a SEP-only operating system that is separate from the host operating system or the operating system executed by the peripheral processing system 106 of FIG. 1. In one embodiment, the SEP operating system is a micro-kernel based operating system that is optimized for mobile or embedded processors. The processor(s) 332 can couple with the secure mailbox 360 and the power control unit 364. The power control unit 364 can be coupled to the clock control unit 366 and an external power manager. The clock control unit 366 can also be coupled to the power manager, which can an input clock signal. The clock control unit 366 can then provide clock signals to the other components of the SEP 260. In one embodiment, a second AES encryption engine 336B can couple with a set of fuses that define the UID 368, which at least quasi-uniquely identifies the specific device that includes the SEP 260. The second. AES encryption engine 336B may be responsible for secure key generation and can output generated keys to cryptographic circuits and/or other circuitry within the SoC that houses the SEP 260, such as the cryptographic engine 234 within the NVM controller 230 of FIG. 2.

In one embodiment, the filter 362 can be configured to tightly control access to the SEP 260 to increase the isolation of the SEP from the rest of the SoC that contains the SEP (e.g., peripheral processing system 106 of FIG. 1). In an embodiment, the filter 362 may permit read/write operations from the communication fabric (e.g., fabric 250 of FIG. 2) to enter the SEP 260 only if the operations address the secure mailbox 360. The secure mailbox 360 may include an inbox and an outbox, which each may be first-in, first-out (FIFO) buffers. The FIFO buffers may have any size and can contain any number of entries, where each entry can store data from a read or write operation. In one embodiment, the inbox is configured to store write data from write operations sourced from the fabric (e.g., fabric 250 of FIG. 2.), while the outbox can store write data from write operations sourced by the processor(s) 332. In one embodiment, the filter 362 can permit write operations to the address assigned to the inbox portion of the secure mailbox 360 and read operations to the address assigned to the outbox portion of the secure mailbox 360. All other read/write operations may be discarded or blocked by the filter 362.

In one embodiment, the filter 362 responds to other read/write operations with an error and can sink write data associated with a filtered write operation without passing the write data on to the local interconnect 370. In one embodiment, the filter 362 can also supply nonce data as read data for a read operation that is filtered. The supplied nonce data can be any data that is unrelated to the address resource within the SEP 260, and may be all zeros, all ones, random data from a random number generator, data programmed into the filter 262 to respond as read data, the address of the read transaction, or other data. In an embodiment, the filter 362 only filters incoming read/write operations, allowing components within the SEP 260 to have full access to other components to which the SEP is integrated. In such embodiment, the filter 362 will not filter responses from the SoC fabric that are provided in response to read/write operations issued by the SEP 260.

In one embodiment, write data for write operations generated by the SEP processor(s) 332 that are to be transmitted by the SEP 260 may optionally be encrypted by an AES encryption engine 336. An attribute of the write operation issued by the SEP processor 332 may indicate whether data is to be encrypted. The attribute may be a packet field, in packet-based embodiments, a signal transmitted with the write operation, in bus-based embodiments, or may be transmitted in any other desired fashion. In the illustrated embodiment, the encryption circuit 336A may implement encryption that is compatible with the AES. However, other embodiments may implement any encryption algorithm, including but not limited to ECC, RSA, or DES encryption.

The power control unit 364 may be configured to control the power gating of the SEP 260. The power control unit 364 may be coupled to the SEP processor(s) 332, and may monitor the processor to determine when power gating is to be requested. Responsive to determining that power gating is to be requested, the power control unit 364 can transmit a power gating request (e.g., Power Down) to an external power manager. The power manager can determine that the SEP 260 is to be powered gated, and may then power gate the SEP 260. The power control unit 364 may also be configured to control clock gating in the SEP 260. Alternatively, the clock control unit 266 may be configured to control the clock gating in the SEP 260. Clock gating may be controlled locally, or may be requested from the power manager in various embodiments.

The clock control unit 366 may be configured to control the local clocks in the SEP 260. The clock control unit 366 may be coupled to receive an input clock and may generate the clocks local to the SEP 260. The clock control unit 266 may be programmable (e.g. by the SEP processor(s) 332) with clock ratios, clock enables, clock gating enables, etc. for the various clocks in the SEP 260.

The secure ROM 334 is coupled to the local interconnect 370, and may respond to an address range assigned to the secure ROM 334 on the local interconnect 370. The address range may be hardwired, and the processor(s) 332 may be hardwired to fetch from the address range at boot to boot from the secure ROM 334. The secure ROM 334 may include the boot code for the SEP 260 as well as other software executed by the SEP processor(s) 332 during use (e.g. the code to process inbox messages and generate outbox messages, code to interface to the security peripherals 336A-336E, etc.). In an embodiment, the secure ROM 334 may store all the code that is executed by the SEP processor 332 during use.

In one embodiment, the security peripherals 336A-336E include an authentication circuit 336C that is used to perform authentication operations for the SEP 260. The authentication circuit 336C may implement one or more authentication algorithms, such as but not limited to a secure hash algorithm (SHA) such as SHA-1, SHA-2, SHA-3, or any other authentication algorithm. In one embodiment, the authentication circuit can work in concert with various other secure peripherals 336E within the SEP 260.

In addition to security peripherals designed to perform specific functions, there may also be security peripherals that are interface units for secure interfaces such as the secure interface unit 336D. In the illustrated embodiment, the secure interface unit 336D is an interface to an off-chip secure memory that may be used to secure storage by the SEP 260. The secure memory of the SEP can be encrypted using an ephemeral key that is based in part on the UID 368. The ephemeral key is occasionally re-generated. For example and in one embodiment the SEP 260 can re-generate the ephemeral key during each boot cycle. Only the SEP 260 has access to the ephemeral key used to access secure memory. The secure memory enables the SEP 260 to have secure access to system memory to store data that may not fit within memory internal to the SEP 260.

Multi-User SEP Authentication

In some embodiments, the SEP can be used to perform all user authentication for a computing device. Instead of executing system validation logic on an unsecured system processor, system authentication verification operations can be offloaded to the SEP. When a user authentication operation is to be performed, the host operating system of the computing device can provide user credentials to the SEP, which will perform user authentication within a secure environment. The SEP, while performing all user authentication operations, can maintain a count of failed authentication attempts for each user. The SEP can enforce a maximum number of failed authentications that can be performed for a user account. Once the maximum number of authentications has been reached, the SEP can be configured to reject subsequent authentication attempts for the user until an administrator on the system explicitly resets the failed authentication value associated with the user's account. Once an administrator resets the failed authentication value, the user can perform additional authorization attempts, up to the maximum number of configured attempts. Any authentication delays associated with authorization attempts may also be reset.

In one embodiment, a computing device can have multiple mechanisms for accessing user data. In addition to standard console logins via the login screen of the computing device, authentication can also be performed during a remote login session or when accessing data that is shared over a network. In one embodiment, the number of failed login attempts can be tracked individually for different access mechanisms. For example, failed console login attempts can be tracked separately from remote login attempts. Remote and console login attempts may also be tracked separately from remote file system access attempts. In one embodiment, remote login attempts can also have separate tracking mechanisms for remote logins via a graphical user interface and for remote logins via a terminal (e.g., secure shell logins).

Figure 4:
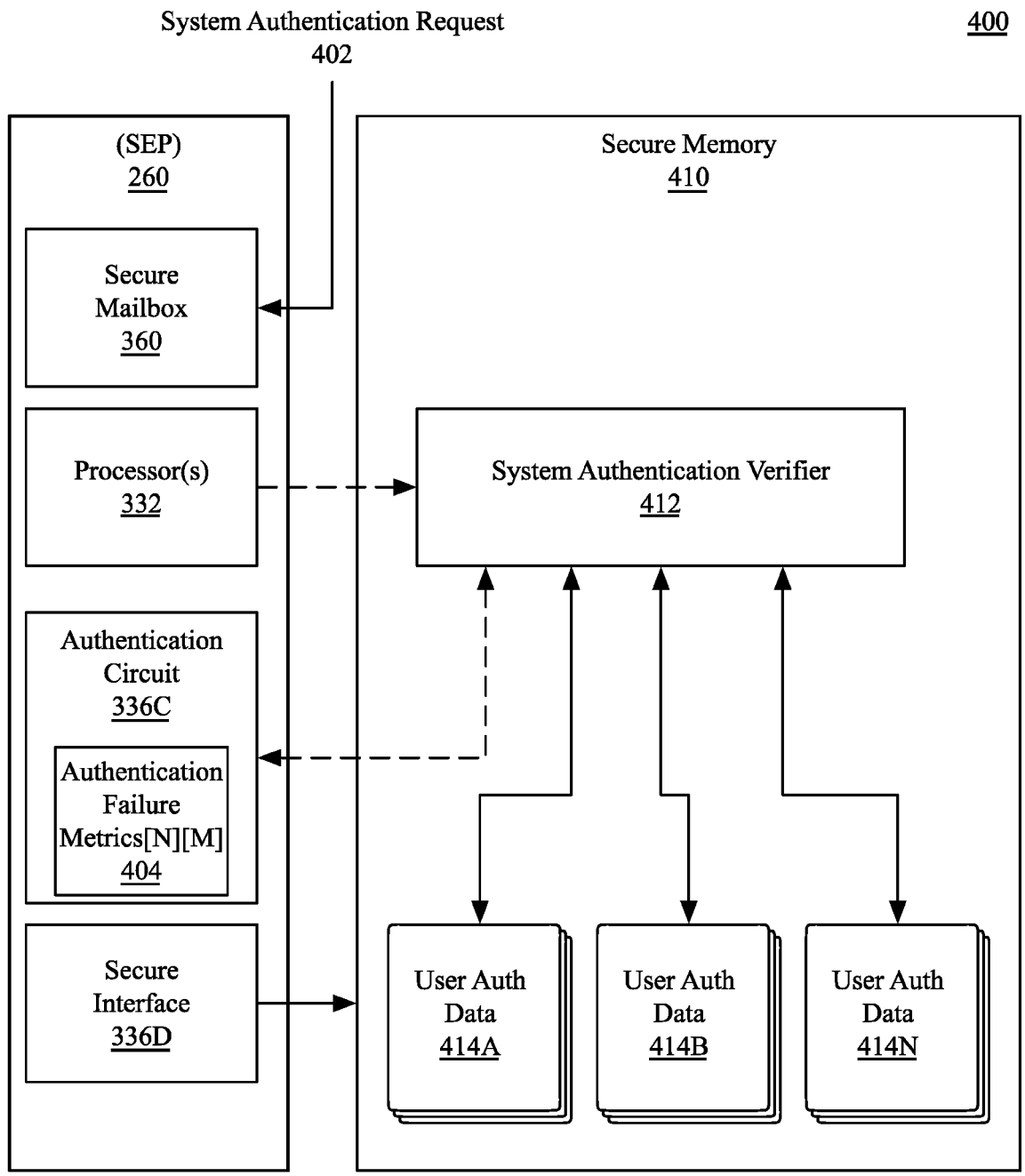
FIG. 4 illustrates a login system implemented via a secure enclave processor, according to an embodiment.

FIG. 4 illustrates a login system 400 implemented via a secure enclave processor, according to an embodiment. In one embodiment, the login system 400 uses a secure enclave processor (SEP) 260 as described herein to process system authentication for console and remote logins to a data processing system. The SEP 260 uses the secure interface unit 336D to enable communication with secure memory 410 within the system. In one embodiment, the secure memory 410 is an encrypted portion of system memory that is accessible only to the SEP 260. For example, the secure memory 410 can be encrypted using a key known only to the SEP 260 and cannot be directly accessed by software or hardware associated with the host operating system. In one embodiment, at least a portion of the secure memory 410 can be included within the SEP 260. In one embodiment, at least a portion of the secure memory 410 can reside within a SoC that houses the SEP 260, such as an SoC of the peripheral processing system 106 of FIG. 1.

One or more processor(s) 332 within the SEP execute a system authentication verifier within secure memory 410 that has access to user authentication data 414A-414N that is managed by the SEP 260. The user authentication data 414A-414N can include authentication credentials for each user, such as but not limited to a cryptographic hash of a user password or biometric data provided by the user, authentication tokens or certificates, one or more cryptographic keys, or other data that may be used to perform user authentication. In one embodiment, authentication is performed in part via an authentication circuit 336C that can accelerate cryptographic hashing operations or other cryptographic operations performed using the user authentication processor. The user authentication data 414A-414N is stored in a secure manner such that instructions executing on the untrusted host processor of the system cannot directly access the data.

During operation, a system authentication request 402 from a host operating system can be received via the secure mailbox 360. The processor(s) 332 can validate the request and supply the request to the system authentication verifier 412. In one embodiment, the request can identify a user to be authenticated, a set of credentials supplied by the user, and the type of authentication being performed. In one embodiment authentications are classified as console-based authentications that are performed at the computing device or remote logins that are performed over a network. In one embodiment, the remote logins can be further categorized based on the type of remote login (e.g., GUI, command line, file sharing, etc.). The cryptographic operations and comparisons for the authentication attempt can be performed via the authentication circuit 336C, which can report a success or failure result to the system authentication verifier 412, which can relay the result to the sender of the system authentication request 402. In the event of a failed authentication attempt, the authentication circuit can update a set of internal authentication failure metrics 404. In one embodiment, the authentication failure metrics are structured to track a number of successive authentication failures for each of N users on the system and for each of M authentication buckets that are separately tracked. In one embodiment, the authentication failure metrics 404 can also be stored in the secure memory 410. However, at least one instance of the authentication failure metrics 404 are stored in a non-volatile manner, such that the metrics will persist through a reboot of the computing device. Once a successful login is determined for a given user and bucket combination, the authentication failure count for that user and bucket is reset to zero. In one embodiment, authentication failure metric buckets are reset individually, such that a successful authentication for a bucket does not reset other buckets for the user.

Figure 5A:
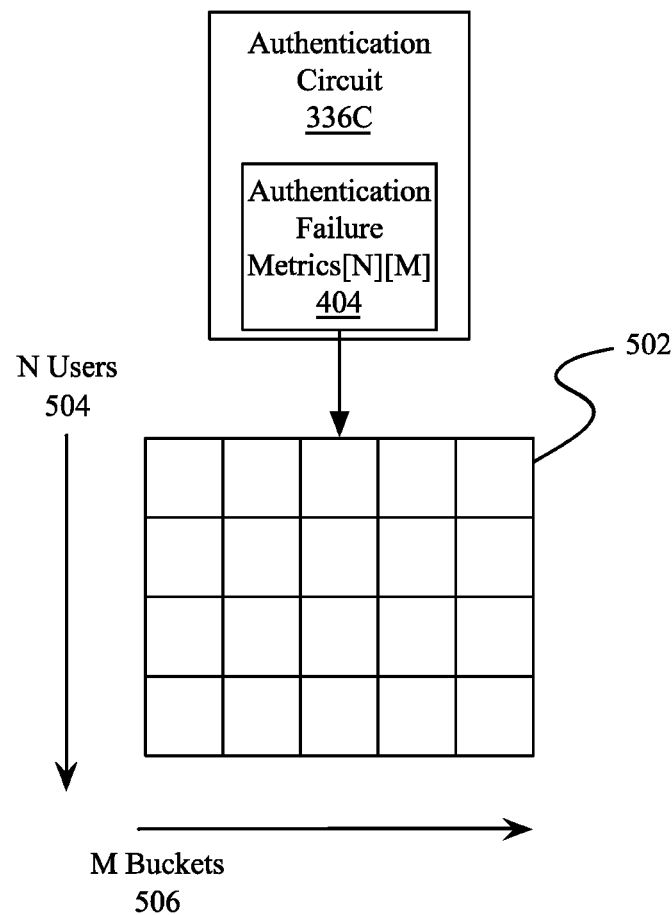
FIGS. 5A-5C illustrate authentication failure tracking and delay, according to embodiments described herein.
Figure 5B:
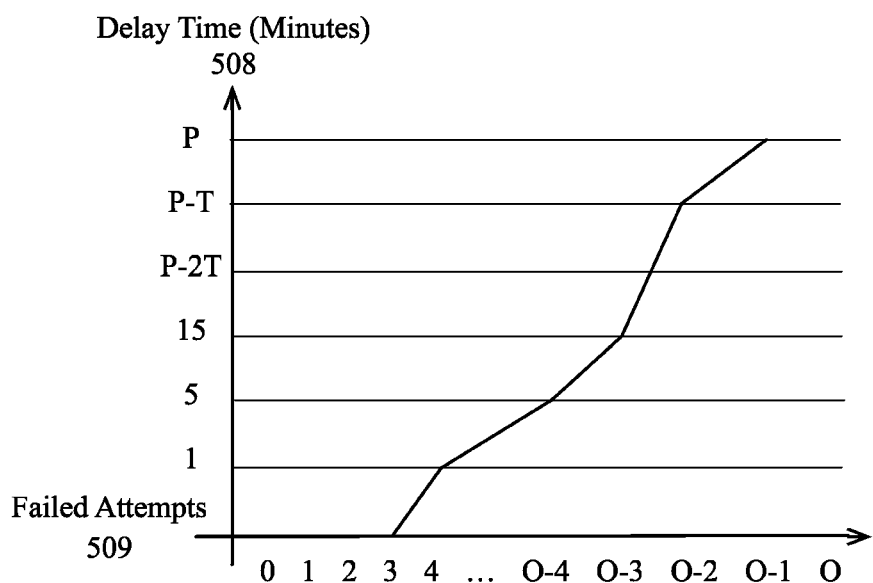
Figure 5C:
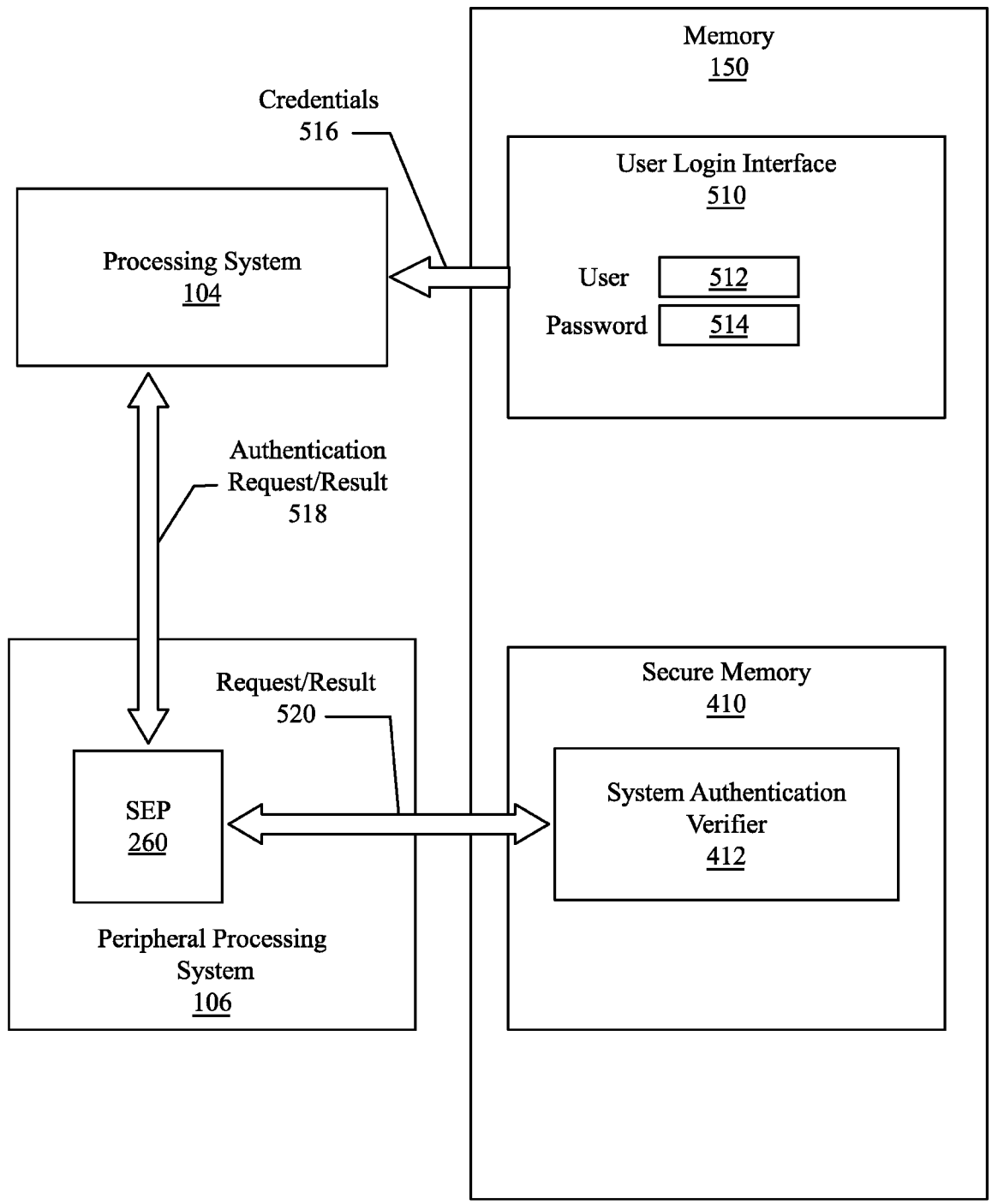

FIGS. 5A-5C illustrate authentication failure tracking and delay, according to embodiments described herein. FIG. 5A illustrates separate tracking of authentication failures based on user and access type. FIG. 5B illustrates authentication delay introduced after repeated authentication failures. FIG. 5C illustrates an authentication system in which system authentication is routed through a secure enclave processor.

As shown in FIG. 5A, in one embodiment the authentication circuit 336C tracks authentication failure metrics 404 via an authentication failure matrix 502 of N users 504 and M authentication buckets 506. The authentication failure matrix 502 is dynamically expandable, such that a new row of authentication buckets is created each time a new user is added to the system. For example, in response to receipt of an authenticated message from an external operating system that executes on a host processing system, the authentication circuit 336C can expand the authentication failure matrix 502 to add an additional row of storage. The columns of each row can store the current number of successive authentication failures for each type of access available on the system, although some cells may not be used for some users if the user does not have rights to access the system via the access type associated with the cells. In one embodiment, access types, for each user, include but are not limited to direct console access, remote console (e.g., screen sharing) access, remote command line access, remote file sharing access, and remote management access. In one embodiment, additional authenticated remote access types are also tracked, such as receiving authenticated remote events. In some embodiments, one or more remote access types may be consolidated into a single bucket. For example and in one embodiment remote console access can be tracked by the same bucket as remote file sharing access.

In one embodiment, authentication failure metrics 404 and the authentication failure matrix are accessible only by components within the secure enclave processor (e.g., SEP 260). In one embodiment, modification of the authentication failure matrix 502 can be performed via one or more processors (e.g., processor 332) within the SEP 260. In one embodiment, a non-volatile instance of the authentication failure metrics 404 is stored that may only be modified via authentication circuit 336C. The count of successive failed authentications for a given user and given authentication type bucket is updated for each successive authentication failure and reset once a successful authentication has been performed. In one embodiment, a successful authentication can reset all buckets associated with a user. In one embodiment, a successful authentication resets only the bucket associated with the authentication type that was successfully performed.

In one embodiment, in addition to access type, separate buckets may be tracked for authentication method. For example, password based authentication may be tracked separately from biometric authentication mechanisms such as fingerprint or camera-based authentication. In such configuration, after a threshold number of successive failed biometric authentication attempts, biometric authentication may be disabled and an alternative authentication mechanism may be required, such as a password, smartcard, or certificate based authentication mechanism.

In one embodiment, once a maximum number of successive failed authentication attempts has been reached for a given user and authentication bucket, authentication for the user for the associated authentication type can be disabled. Once authentication for the authentication user and authentication type is disabled, authentication requests associated with the given user and authentication type will no longer be serviced by the SEP. Under such circumstances, the user may attempt to use an alternative authentication type. For example, and in one embodiment, should an authentication lockout be enabled for remote file sharing on a computing device, if the user is able to be successfully authenticated via a console login, the user can reset the failed authentication count of the remote file sharing bucket associated with the user.

Alternatively, an authenticated administrator of the computing system may reset the number of failed authentication attempts for the user. The authenticated administrator can reset all failed authentication counters for a user or the specific user/bucket combination that has been locked out. In one embodiment, the reset of the failed authentication counts for a user may require a reset or replacement of one or more user access credentials, such as, for example, a password reset. A reset of a value within the authentication failure metrics 404 may only be performed via the SEP and, in one embodiment, in response to an authenticated request received via the secure mailbox 360 shown in FIG. 3 and FIG. 4.

As shown in FIG. 5B, in one embodiment an authentication delay 508 can be introduced by the SEP once the number of failed authentication attempts 509 exceed a delay threshold. The illustrated relationship between the introduced delay and the number of failed attempts is exemplary and embodiments can structure different relationships across computing devices and configurations. In one embodiment, based on the relationship between successive failed authentication attempts 509 and the authentication delay 508, the SEP can force a delay of up to P minutes before processing additional authentication attempts for the user and bucket combination in question. Where a lockout threshold of O is in place, the maximum delay time of P minutes is reached at O−1 failed attempts. In one embodiment while a delay is in place for a user for one authentication type described herein, the user may attempt account authorization via an alternative authentication type. For example, where authentication for remote file sharing access is delayed for a user, the user may attempt to authenticate via a remote console login.

In one embodiment, delays are shared for multiple remote or console access types, such that, for example, multiple remote access types share a common delay. In such embodiment, a common delay for multiple remote access types may be imposed even when the number of failed access attempts are tracked separately for the different types of remote access. For example, authentication for remote console logins can be delayed in response to a delay imposed due to the number of authentication failures for remote file sharing. In such embodiment, the number of failed authentication attempts for different types of grouped access types may be tracked separately, while the access delay imposed may be a combination of the different access delays in effect (e.g., a minimum, maximum, average, sum, weighted average, weighted sum, etc.). The imposed delays may be reset in response to a successful authentication. In one embodiment, a successful authentication resets all delays for a user. In one embodiment, a successful authentication resets only the specific delay associated with the access type.

As shown in FIG. 5C, in one embodiment all system authentication attempts for a data processing system are routed through a secure enclave processor. A data processing system having a processing system 104 and memory 150 as illustrated in FIG. 1 can be a heterogeneous processing system including one or more data processors, image processors and/or graphics processing units. The processing system 104 can generate a user login interface 510 in the memory 150 for display. The user login interface 510 can be displayed locally to the computing device via a local display device for a console login or can be displayed via a network interface to facilitate a remote console login. A variant of the user login interface 510 can also be displayed to accept credentials for a file sharing login or another remote access that requires user authentication. The variant of the user login interface 510 for the file sharing login can be generated and displayed by the remote computing device from which the remote access is attempted, and can include user interface elements that are common to the operating system of the data processing system and/or computing device from which the remote access is attempted.

In one embodiment, the user login interface 510 includes user 512 and password field 514 to accept login credentials from a user. However, the user login interface 510 may also accept other authentication credentials, such as smartcard credentials, or biometric credentials gather via one or more biometric sensors (e.g., bio sensor(s) 115 of FIG. 1). The credentials 516 gathered via the user login interface 510 can be packaged into an authentication request and sent over an authentication request/result channel 518 to a peripheral processing system 106. The peripheral processing system 106 is, in one embodiment, an SoC containing the SEP 260. The authentication request can be received via the secure mailbox on the SEP 260 and, if the authentication request is a valid and authentic request, the SEP 260 can relay the request (e.g., request/result 520) to a system authentication verifier 412. The system authentication verifier 412 resides in secure memory 410 accessible only to the SEP 260 and, in one embodiment, is accessed during all user authentication operations within the system. If the authentication is successful, the system authentication verifier 412 can send a result (e.g., request/result 520) to the SEP 260, which can signal an authentication success to the processing system 104 via the authentication request/result channel 518. If the authentication is not successful, the SEP 260 can signal an authentication failure message to the processing system 104 and increment a failed authentication count for the user and the type of authentication. The failed authentication count for a user can be cached within the secure memory 410 or specifically within the system authentication verifier 412, while non-zero failed authentication count values can be stored in non-volatile memory within the SEP 260 to allow the failed authentication count to persist across system reboots and without requiring network access to persist the failed authentication count. After an unsuccessful authentication, the SEP 260 can also enforce a delay before subsequent authentication requests of the same type will be serviced.

Figure 6:
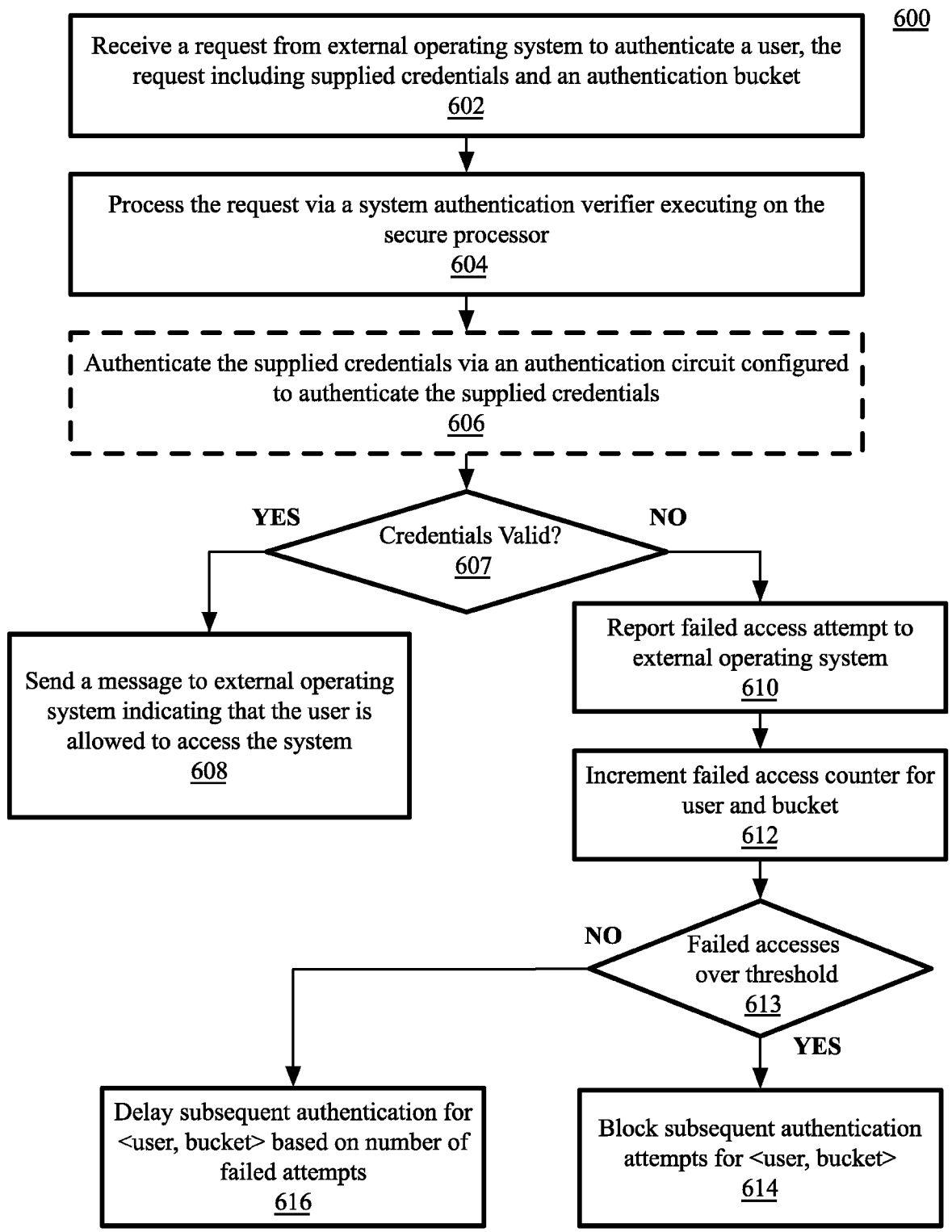
FIG. 6 illustrates operations for logic to perform secure enclave authentication for a multi-user data processing system.

FIG. 6 illustrates operations for logic 600 to perform secure enclave authentication for a multi-user data processing system. The logic 600 enables user authentication for a multi-user data processing system having an arbitrary number of users to be performed via a secure enclave processor (SEP). Performing user authentication for the data processing system via a SEP enables authentication to be performed in a secure manner even if the data processing system has been compromised. The SEP can sequester user keys and authentication operations such that untrusted system processor(s) of the data processing system cannot access user credentials. In one embodiment, the logic 600 resides within a peripheral processor SoC within the data processing system. In one embodiment, the logic 600 resides within a SEP located within the peripheral processor SoC. While a peripheral SoC has been described herein as hosting the SEP, in one embodiment the logic 600 can reside within a standalone SEP within a secure circuit region of the host processing system.

In one embodiment, the logic 600 performs an operation 602 to receive a request from an external operating system to authenticate a user. In one embodiment, the external operating system is the host operating system that executes on the processing system 104 of FIG. 1. In one embodiment, the external operating system is an operating system that executes on the peripheral processing system 106 of FIG. 1. The request received from the external operating system can include credentials supplied for use in authenticating the user, as well as an authentication type, and an identifier for an authentication type or authentication bucket associated with the authentication type.

The logic 600 can perform an additional operation 604 to process the request received at operation 602 via a system authentication verifier. In one embodiment, the system authentication verifier is enabled via program logic or firmware logic that executes via processor cores within the SEP. The system authentication verifier has access to the credentials that are used to verify the request to authenticate the user and to authenticate the user via the supplied credentials. In one embodiment, the request to authenticate the user can be encrypted and/or signed using keys or certificates that identify the operating system as authentic. The system authentication verifier and/or other logic with the SEP and/or the peripheral processing system can verify received authentication requests before those requests are processed.

In one embodiment, the logic 600 can perform an operation 606 to authenticate the supplied credentials via an authentication circuit configured to authenticate the supplied credentials. The authentication circuit operations may not be performed by all embodiments, and some embodiments can use other security peripherals within the SEP to authenticate the supplied credentials. The authentication can include applying a cryptographic function to the supplied credentials and comparing the result of the cryptographic function with the stored authentication credentials for the user. In one embodiment, biometric information within the supplied credentials can be compared with stored biometric data for the user.

If the authentication circuit of operation 606, or an alternative authentication operation, determines that the credentials are valid, block 607 shows that the logic 600 can perform an operation 608 to send a message to the external operating system that indicates that the user can access the system or system resources. If the credentials are not valid, block 607 shows that the logic 600 can perform an operation 610 to report the failed access attempt to the external operating system. The logic 600 can then perform an additional operation 612 to increment a failed access counter associated with the user and authentication bucket.

Further in response to a failed authentication attempt, the logic 600 can determine at block 613 whether the number of failed accesses indicated by the incremented failed access counter is over a lockout threshold. If the logic 600 determines that the number of failed access is over the lockout threshold, the logic 600 can perform an operation 614 to block subsequent authentication attempts for the <user, bucket> combination. If the number of failed accesses is not over the lockout threshold at block 613, the logic 600 can perform an operation 616 to delay subsequent authentication operations for the <user, bucket> combination. The delay period is based on the number of failed attempts, as shown in FIG. 5B. Once the delay period has expired, the logic 600 can continue to receive and process authorization attempts for the user and bucket for which attempts are delays. However, while an authorization delay is in place for a given <user, bucket> combination, authorization attempts for other users and buckets are not delayed. In other words, authorization delays are imposed separately for each type of authentication and for each user.

Default Storage Volume Encryption for Multi-User Computing Devices

Embodiments described herein enable enhanced data security for a multi-user computing device and/or data processing system by enabling storage volume encryption by default, without requiring user-based entropy for the generation of encryption keys. In such embodiment, when a user does not enable explicit per-user encryption of data within the computing system, the computing system can generate a set of device specific keys to use to encrypt storage devices on the computing system. Enabling system managed encryption enables a user, for example, to enable automatic logins to a specific user account on a system, without requiring the user to enter authentication credentials, while also allowing one or more partitions or storage volumes on the computing device to be encrypted. In such configuration, a system managed key encryption key (KEK) can be generated to enable the system to decrypt a volume encryption key (VEK) that can be used by a non-volatile memory controller to encrypt and decrypt data stored within non-volatile memory.

One or more volume encryption keys can be generated during system provisioning to individually encrypt and decrypt storage volumes on the computing devices. with requiring user entropy to generate those keys. The system can generate encryption keys and encrypt storage volumes by default in a manner that is transparent to the users of the data processing system. To enable multi-user access to the data processing system, group keys can be created, such that via membership within a group on the system (e.g., administrators, users, etc.) can enable different levels of access to the system. When group encryption is enabled, adding a new member to a group may require authorization to be explicitly provided by an existing member of the group. In one embodiment, the system can be transitioned from the default encryption mode unto an explicit encryption mode, in which a set of per-user keys are generated for each user based on per-user entropy. The transition between user-based protection and system-based protection can be performed in a secure and non-replayable manner, such that an adversary having access to system-based decryption keys cannot reuse those keys once the system is transitioned to per-user encryption. In one embodiment, the encryption system can be configured such that a user can explicitly select the storage partitions or storage volumes that may be automatically locked or unlocked without user entropy (e.g., without use of an encryption key generated based on a user passcode).

Figure 7:
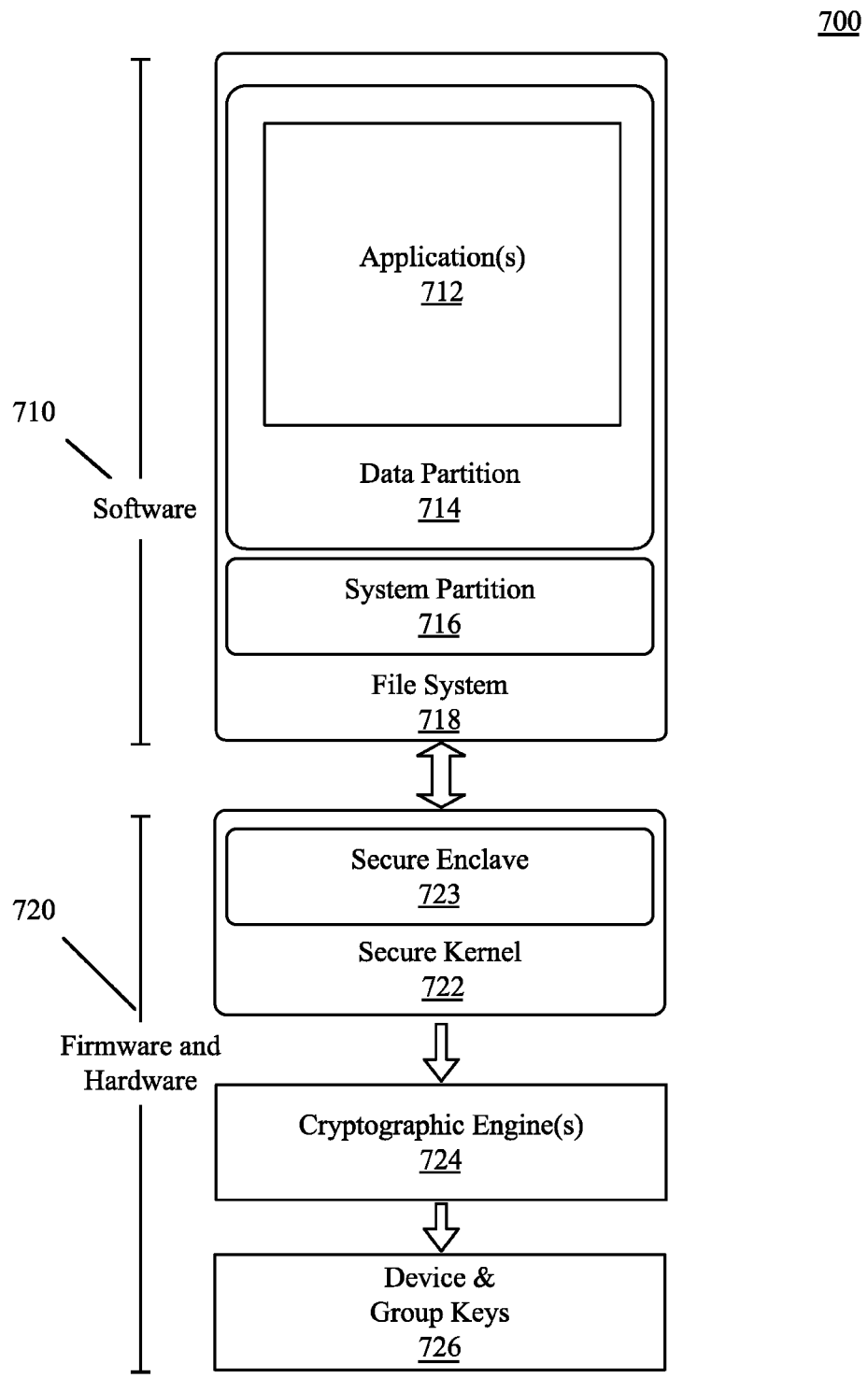
FIG. 7 illustrates software and hardware architecture of a storage encryption system, according to an embodiment.

FIG. 7 illustrates software and hardware architecture of a storage encryption system 700, according to an embodiment. The storage encryption system 700 includes a software layer 710 and a firmware and hardware layer 720. The software layer 710 includes one or more application(s) 712 that are loaded from and access a data partition 714. The software layer also includes a system partition 716 that includes operating system logic. The operating system logic includes one or more shared libraries that provide system framework interfaces, as well as kernel or microkernel logic that manages core system resources. The system partition 716 also stores driver logic to enable access to the firmware and hardware layer 720.

In one embodiment, the firmware and hardware layer 720 is housed in a peripheral processing system such as the peripheral processing system 106 of FIG. 1, which executes a secure kernel 722 in communication with a secure enclave 723. The secure enclave 723 can be enabled via a secure enclave processor (SEP) as described herein (e.g., SEP 260).

The secure enclave 723 isolates one or more cryptographic engines(s) 724 from the remainder of the computing device and houses device & group keys 726 that is used to encrypt key data that are used to access storage devices and/or other secure peripherals within the system. The device & group keys 726 include device keys that are specific to the device containing the storage encryption system 700 that may be derived in part based on unique identifier, such as the UID 368 of FIG. 3. The device & group keys 726 also include group keys that allow users to be associated with a group of users. The group keys can be used as key encryption keys within a chain of encryption keys that are used to encrypt a volume key, for example, for a system partition 716.

Figure 8:
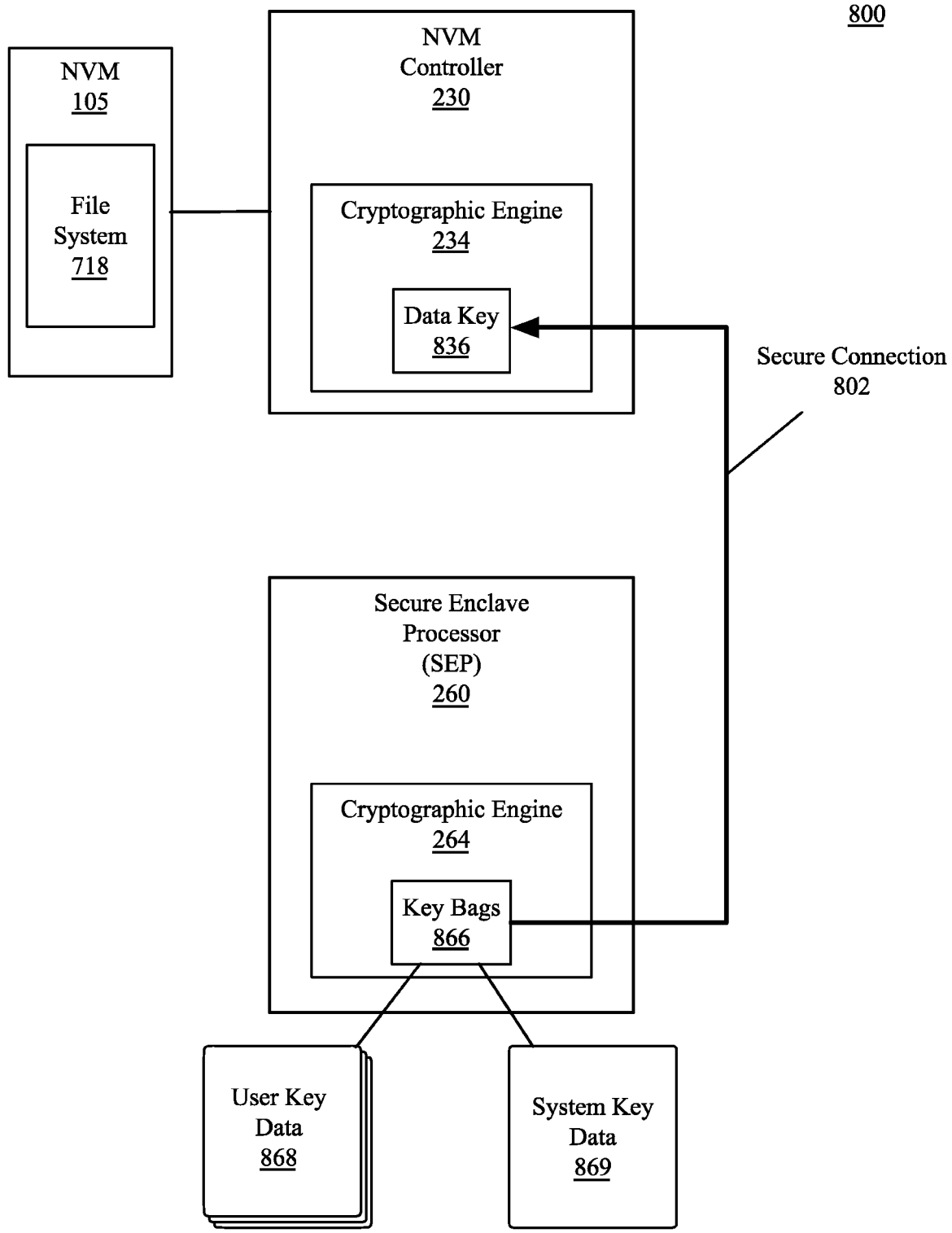
FIG. 8 illustrates an encryption system that enables per-user and system based encryption of stored data, according to an embodiment.

FIG. 8 illustrates an encryption system 800 that enables per-user and system based encryption of stored data, according to an embodiment. A non-volatile memory controller (e.g., NVM controller 230) as described herein can control access to non-volatile memory 105 that stores a file system 718 having encrypted data. Access to the encrypted data is enabled via the cryptographic engine 234 within the NVM controller 230. The cryptographic engine 234 can access encrypted files within the file system 718 via copies of a data key 836 provided by the secure enclave (e.g., SEP 260). The data key 836 can include or enable the derivation of a volume encryption key (VEK) that is used by the cryptographic engine 234 within the NVM controller 230 to automatically decrypt data read from the file system 718 of the NVM 105 and automatically encrypt data written to the file system 718 on the NVM 105. Data transfer between the cryptographic engine 234 in the NVM controller 230 and the SEP 260 is enabled via a secure connection 802. The secure connection 802 is an encrypted connection that is secured using shared keys known only to the cryptographic engine 234 and the SEP 260.

A computing device that houses the encryption system 800 can employ several passcodes and associated encryption keys, where multiple passcodes or encryptions keys may be associated with each different user account on the system. For example, when user-based storage volume encryption is enabled on a computing device with a plurality of user accounts, separate keys can be generated for each account to enable the account to access to the computing device's file system and/or applications. Specific portions of the device's file system may be secured by these keys or the entire device storage volume can be secured. Additionally, specific applications can be encrypted, such that the application requires the use of keys to execute and/or to enable access to specific functions. In some implementations, the file system and individual applications require separate keys, where the separate keys differ among user accounts. In such implementations, the user passcodes associated with the user accounts can provide entropy that is used to generate the encryption keys associated with the accounts. For example and in one embodiment, when user entropy based encryption is enabled, the SEP 260 can use an internal cryptographic engine 264 wrap the data keys 836 via user key data 868, which include encryption keys for each user that are derived or generated using credentials supplied by the users. For example, a user passcode can be used to provide entropy used to generate the user key data 860.

While user-entropy based encryption may be enabled by a user, by default, the computing device is provisioned with system key data 869. The system key data 869 can be derived via entropy supplied via a random number or random data value generated by the SEP 260. The system key data 869, in one embodiment, can be stored in the SEP 260 or encrypted using key data stored within the SEP 260.

The encrypted system key data 869 can be stored on the NVM 105 and decrypted by the cryptographic engine 264.

In one embodiment, the system key data 869 can be generated in a non-replayable manner, such that upon transitioning away from system control of unlocking and decrypting a storage partition or storage volume, the system key data 869 can be revoked. Revocation prevents any previously stored or retrieved system key data 869 from being reused after changing encryption methodology.

Non-Replayable Key Generation

Figure 9A:
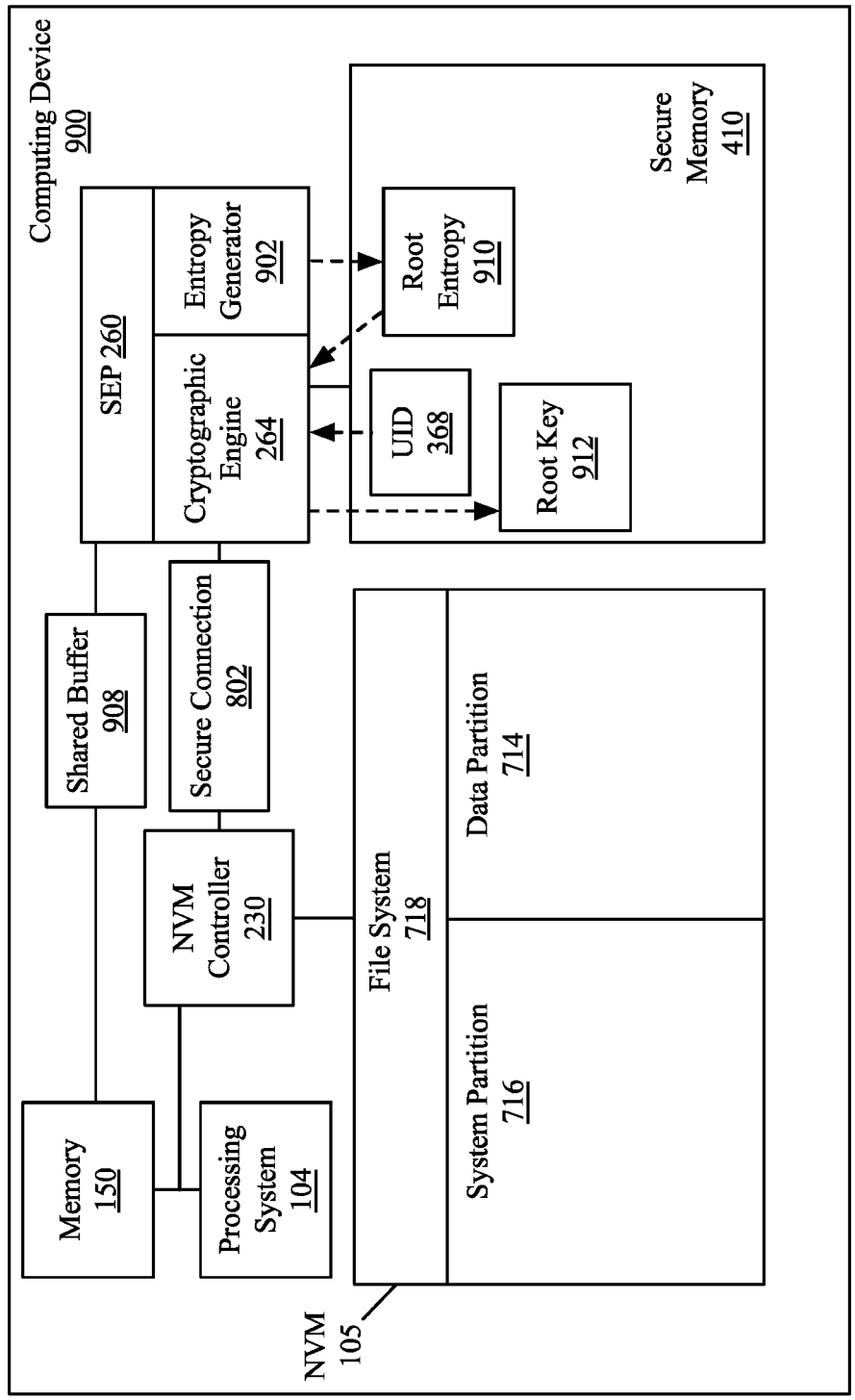
FIGS. 9A-9E illustrate a computing device configured to generate a revocable keychain for storage encryption, according to embodiments described herein.
Figure 9B:
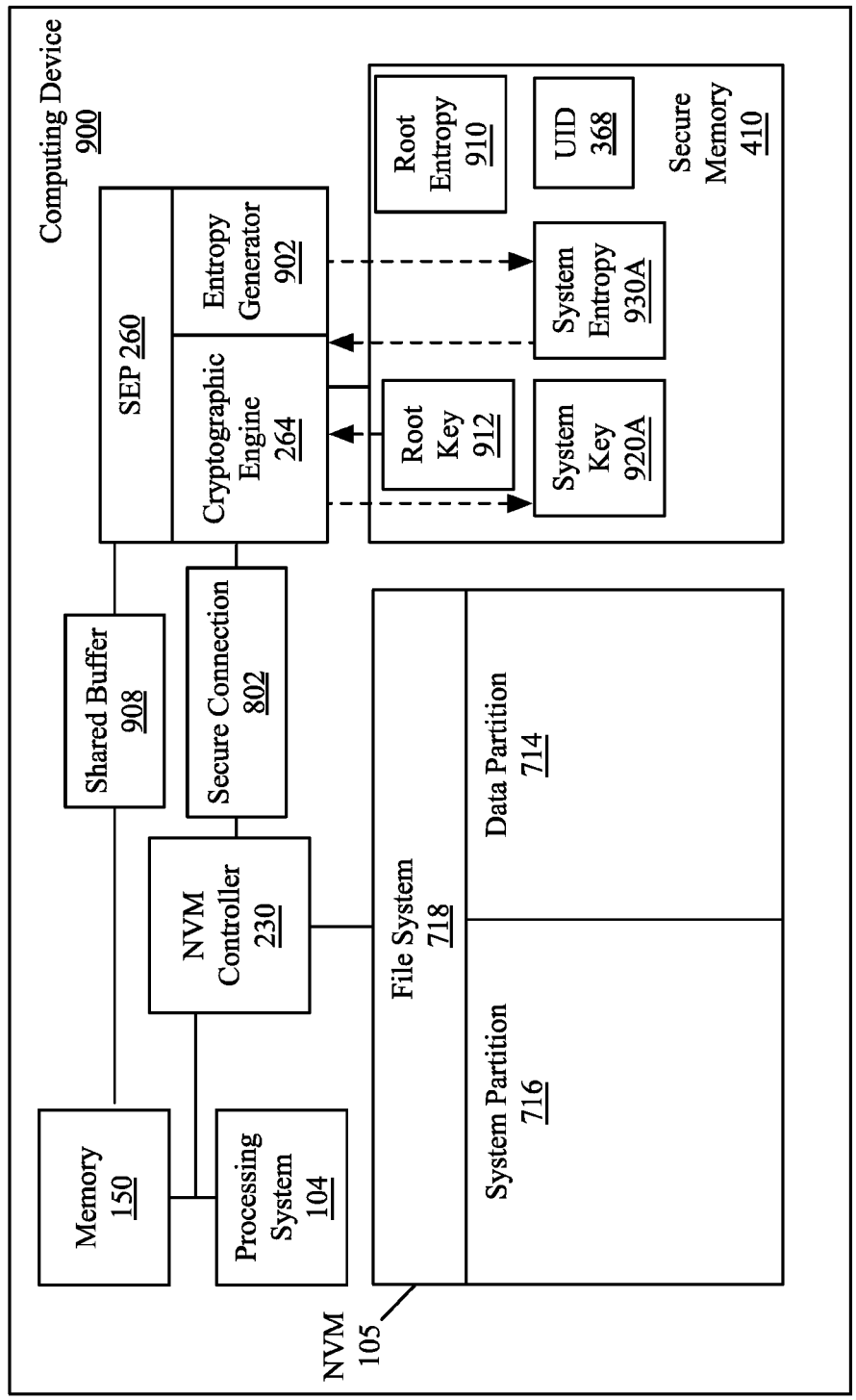
Figure 9C:
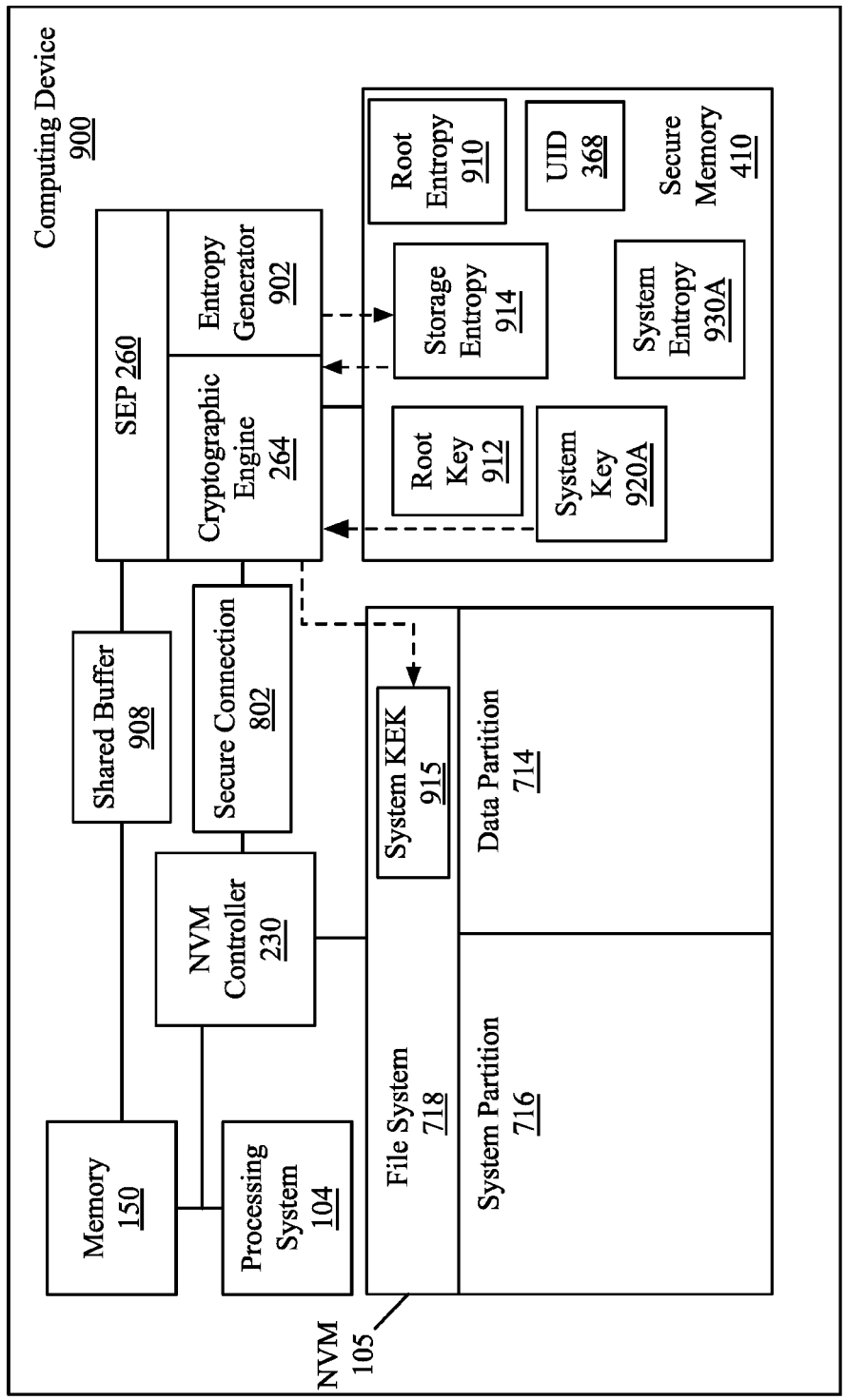
Figure 9D:
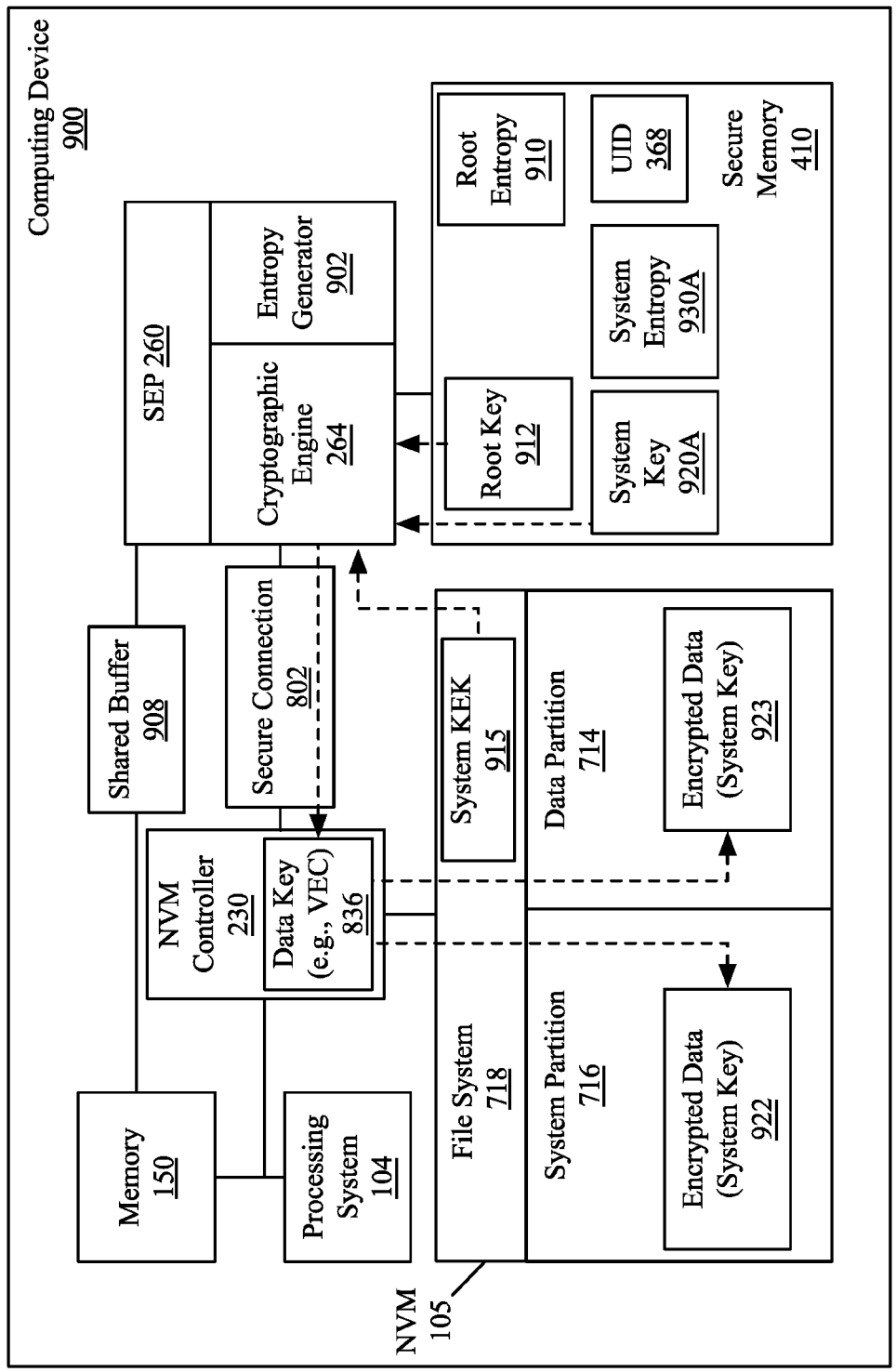
Figure 9E:
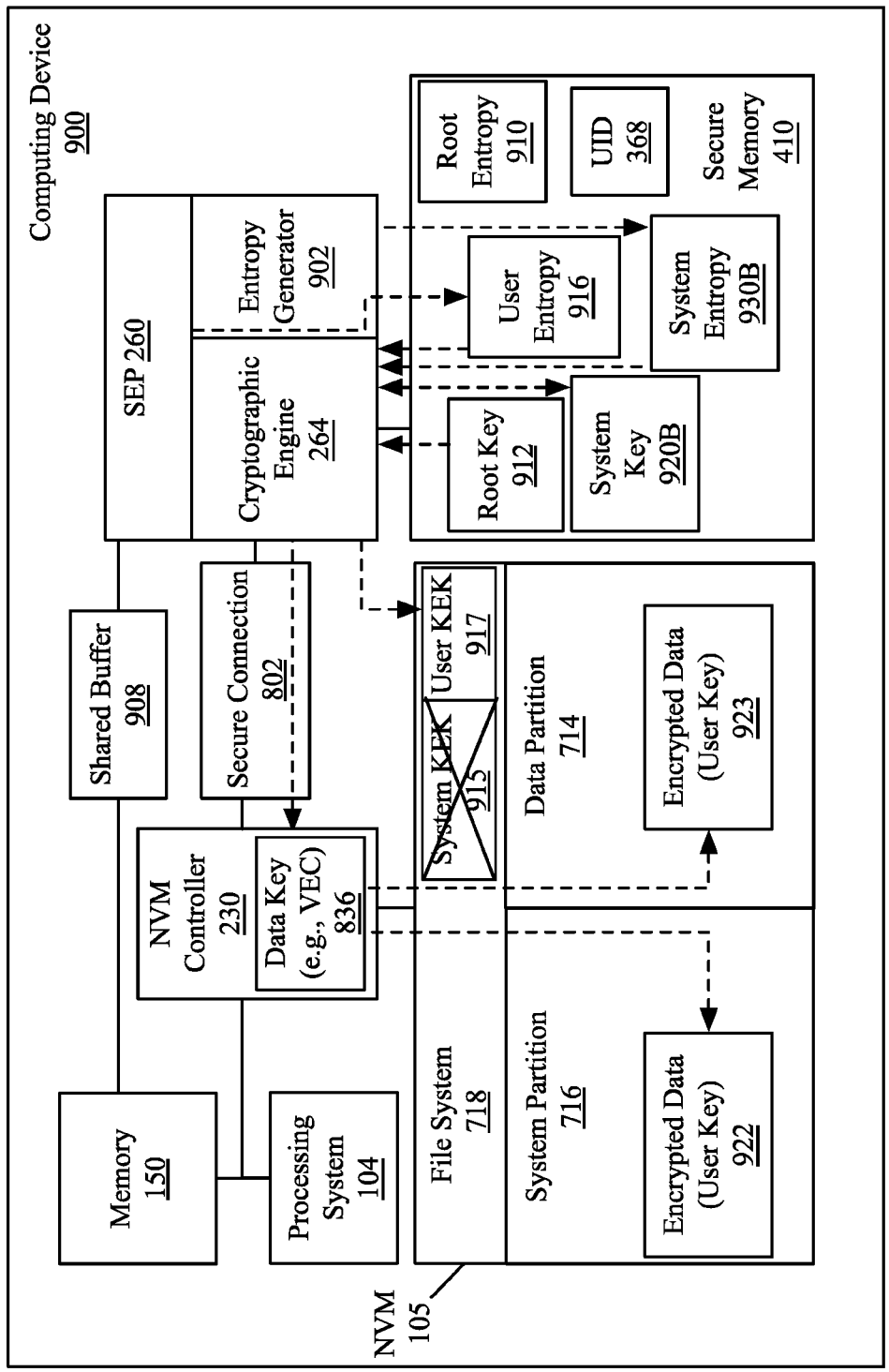

FIGS. 9A-9E illustrate a computing device 900 configured to generate a revocable keychain for storage encryption, according to embodiments described herein. Multiple embodiments are illustrated and the various aspects of each embodiment can be combined in various ways. FIG. 9A illustrates root key generation. FIG. 9B illustrates system key generation. FIG. 9C illustrates system key encryption key (KEK) generation and storage. FIG. 9D illustrates default storage encryption via a system generated KEK. FIG. 9E illustrates system KEK revocation during transition to encryption having keys derived based on user entropy (e.g., passcode, biometric data, etc.) associated with user accounts.

As shown in FIG. 9A, the computing device can include various previously illustrated components including a memory 150, a processing system 104, non-volatile memory and a non-volatile memory controller (NVM 105, NVM controller 230), a secure enclave processor (SEP 260), and secure memory 410. The SEP 260 includes a cryptographic engine 264, which can enable accelerated encryption and decryption of data that is encoded in one or more encryption formats described herein. The SEP 260 can include multiple cryptographic engines, at least one of which may be used to encrypt the secure memory 410. In one embodiment, the secure memory 410 is an encrypted portion of the memory 150 that is encrypted using keys known only to the SEP 260. However, in one embodiment at least a portion of the secure memory 410 resides within memory or other hardware logic that is internal the SEP 260.

In one embodiment, the various components within the computing device 900 communicate via a crossbar fabric, although one or more system busses may also be used in other embodiments. In one embodiment, the NVM controller 230 is in direct communication with the NVM 105 and communicates via a high-speed bus, such as a peripheral component interconnect (PCI) express bus. The NVM controller 230 can communicate with the SEP 260 via a secure connection 802 as described herein. The NVM 105 includes a file system 718 as described herein, which includes at least a data partition 714 and a system partition 716.

In one embodiment, the processing system 104 and the SEP 260 communicate via a shared buffer 908. The processing system 104 can place data to be read by the SEP 260 in the shared buffer 908 and send an interrupt, signal or message to the SEP 260 via the secure mailbox within the SEP 260. The SEP 260 can then read data from the shared buffer 908. The SEP 260 can also send data to the processing system 104 via the shared buffer 908. The SEP 260 can place data to be read by the processing system 104 and interrupt the one or more processors within the processing system 104, which can then read the data from the shared buffer 908. The SEP 260 includes an entropy generator 902, which is a circuit configured to generate random or pseudorandom data. In one embodiment, the entropy generator 902 is a cryptographically secure pseudo-random number generator (CSPRNG). The entropy generator 902 can be used to generate entropy data used during system key generation, such as a root entropy 910. The root entropy 910 can be used as input to the cryptographic engine, along with the UID 368 for the computing device 900, where the UID 368 is an identifier that is unique or at least quasi-unique to the computing device 900 and may be stored internally within the SEP 260.

Based on the UID 368 and the root entropy 910, the cryptographic engine 264 can generate a root key 912. The root entropy 910 and the root key 912 can be stored within the secure memory 410. The root key 912 can be regenerated from the UID 368 and root entropy 910 as needed. A multi-level chain of keys can be generated starting with the root key using a key derivation function and additional entropy, where each level in the keychain is dependent upon the higher layer.

As illustrated in FIG. 9B the entropy generator 902 can generate a first system entropy value 930A. The cryptographic engine 264 can then apply a cryptographic function using the root key 912 and the first system entropy value 930A to generate a first system key 920A. The first system entropy 930A can be stored within the secure memory 410. Unlike the root key 912, the first system key 920A may not be persistently stored and may be re-generated during each secure boot cycle of the SEP 260. The generation of the first system key 920A will be result in the same key value each boot if the root key 912 and the first system entropy 930A do not change.

As illustrated in FIG. 9C, the entropy generator 902 can generate a storage entropy 914, which may be generated during system provisioning and operating system installation. The storage entropy 914 can be used as input to the cryptographic engine 264 for use in generating a system key encryption key (system KEK 915). For example and in one embodiment, a hash-based message authentication code (HMAC) key derivation function can be used that accepts the system key 920A as an input key and the storage entropy 914 as a cryptographic seed or salt to generate the system KEK 915. The system KEK 915 can then be further encrypted using one or more secret keys known only to the SEP 260 and stored in the NVM 105.

As illustrated in FIG. 9D, the system KEK 915 can be used to enable access to encrypted data 922, 923 within the NVM 105. In one embodiment, the processing system 104 can read the encrypted system KEK 915 from the NVM 105 and provide the encrypted system KEK 915 to the SEP 260 via the shared buffer 908. The processing system 104 does not store any key data that may be used to decrypt the system KEK 915 and relies entirely on the SEP 260 to enable access to the encrypted data 922, 923. Once the system KEK 915 is provided to the SEP 260, the system KEK 915 is decrypted by the SEP 260 and used to access the data key 836 (e.g., volume encryption key) that is used to access the encrypted data 922, 923. The system KEK 915 can be the encryption key that is used to decrypt an encrypted version of the data key 836 that is stored within the SEP 260, or can be used to derive the decryption key that is used to decrypt the data key 836. For example, the system KEK 915, once decrypted by the SEP 260, can be used as a seed to derive the actual VEK data key 836 from the first system key 920A and, in one embodiment, the root key 912. The VEK can then be supplied to the NVM controller 230 over the secure connection 802. A cryptographic engine within the NVM controller 230 can then use the VEK as a data key 836 to read or write the encrypted data 922, 923. In one embodiment, the VEK is re-encrypted for communication over the secure connection 802 and decrypted by the cryptographic engine within the NVM controller 230 once received via the secure connection 802.

The file system 718 within the NVM 105 can include multiple partitions, including at least one system partition 716 and at least one data partition 714. The system partition 716 can include boot data for the operating system, while the data partition 714 can include user data and may also include a portion of the operating system data of the computing device 900. Beyond the default system-based encryption described herein, additional levels of encryption can be enabled. For example, per-file encryption can be enabled, in which a per-file encryption key is wrapped with one of several class keys, depending on the circumstances under which the file should be accessible. Such encryption can be enabled over and above the default system-based encryption described herein.

As shown in FIG. 9E, some embodiments enable a user to opt into a user-entropy based encryption mechanism in which one or more partitions on the file system 718 are made accessible via keys that are derived based on user-supplied entropy. In one embodiment, the transition can be performed without requiring re-encryption of data that was previously encrypted via the default encryption method. In such embodiment, the data key 836 used to access the data does not change. However, a user KEK 917 is generated based on user entropy 916. The user entropy 916 can be a passcode or biometric data that is provided to the SEP 260 by the processing system 104 via the shared buffer 908, although the supplied credentials may also be augmented in part by the entropy generator 902 to produce the user entropy 916. In one embodiment, the user entropy 916 can then be used, along with a system key, to derive the user KEK 917 that can subsequently be used to decrypt the data key 836.

When transitioning from default system encryption to user entropy encryption, it may be beneficial to cryptographically invalidate the previous system KEK 915. Cryptographic invalidation of the previous system KEK 915 can be performed by generating a second system entropy 930B via the entropy generator 902 and using the second system entropy to generate a second system key 920B based on the second system entropy 930B and the root key 912. The second system key 920B can then be used to generate the user KEK 917 based on the supplied user entropy 916. The user can then supply the user KEK 917 to the SEP 260, enabling the SEP 260 to decrypt the data key 836 used to access the encrypted data 922, 923. After the cryptographic invalidation, a previously captured system KEK 915 cannot be replayed to gain access to data, as the system KEK 915 can no longer be used to access the data key 836. In one embodiment, an administrator can also cryptographically revoke keys used by users of the system, such that a previous user of a system can be deleted and any keys that may have been preserved by that user can no longer be used to access encrypted data on the computing device 900.

Figure 10B:
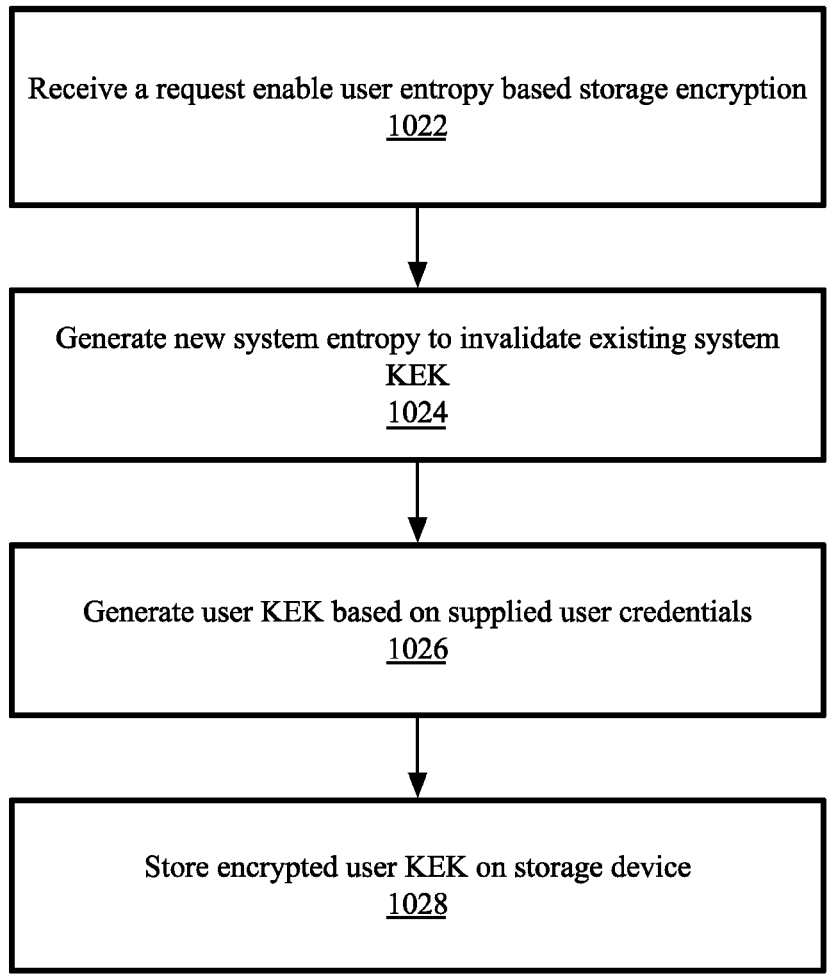

FIGS. 10A-10B illustrate operations associated with logic 1000, 1020 to enable and manage default storage volume encryption, according to embodiments described herein. FIG. 10A illustrates logic 1000 to perform default storage volume encryption on a computing device without requiring user credentials. FIG. 10B illustrates logic 1020 to transition from default system encryption to user credential-based encryption. The logic 1000, 1020 can be implemented via software, firmware, and/or hardware within a computing device having a secure enclave processor, according to embodiments described herein. The secure enclave processor, in one embodiment, is included within a peripheral processing system, such as the peripheral processing system 106 of FIG. 1. The secure enclave processor may be the SEP processor 260 as generally described herein.

As shown in FIG. 10A, logic 1000 can receive a request within a secure enclave processor (SEP) to generate a volume encryption key (VEK) for a storage volume during system provisioning of a computing device, as shown at block 1002. The system provisioning can be performed as a part of an operating system installation process while preparing a storage volume to receive installation of the data file associated with the operating system. The logic 1000 can then generate a VEK for the storage volume and encrypt the VEK for storage within the SEP, as shown at block 1004. The VEK, in one embodiment, is a random encryption key. The VEK can then be encrypted for storage within the SEP. As shown at block 1006, the logic 1000 can generate system entropy within the SEP which is used to generate a system key. The system entropy generated at block 1006 can be used to derive a system KEK within the SEP based on system entropy, as shown at block 1008. The system KEK can be used to enable decryption of the VEK. The system KEK, using the system key, can be used to derive a decryption key within the SEP that can then be used to decrypt the VEK. As shown at block 1010, the logic 1000 can request the storage of an encrypted version of the system KEK within the storage device. The system KEK can be encrypted using a set of keys known only to the SEP.

The generated set of keys allows the logic 1000 to enable access to the encrypted storage volume without requiring entry of user credentials, as shown at block 1012. The encrypted system KEK can be supplied to the SEP, which can decrypt the system KEK and generate a derived encryption key using the encrypted system KEK as entropy. The derived encryption key can then be used to decrypt the actual KEK that is used to encrypt the VEK. The VEK can then be used to unlock the encrypted storage volume.

In one embodiment, a group key system is also implemented in which a group key is included within the key hierarchy. During initial provisioning, the first user to join a group can do so without requiring user entropy from the user to derive group keys. For each additional user added to the group an existing member of the group may be required to provide explicit authorization, for example, via the entry of a credential associated with an existing user account of the group. The supplied credentials can allow the system to incorporate additional users into the group keys of the key hierarchy.

As shown in FIG. 10B, logic 1020 can receive a request to enable user entropy based encryption, as shown at block 1022. As shown at block 1024, the logic 1020 can generate new system entropy, which can be used to invalidate the existing system KEK, as shown in FIGS. 9A-9E. As shown at block 1026, the logic 1020 can then generate a user KEK based on one or more supplied user credentials for one or more user accounts. As shown at block 1028, the logic 1020 can then store an encrypted user KEK on the storage device.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 11:
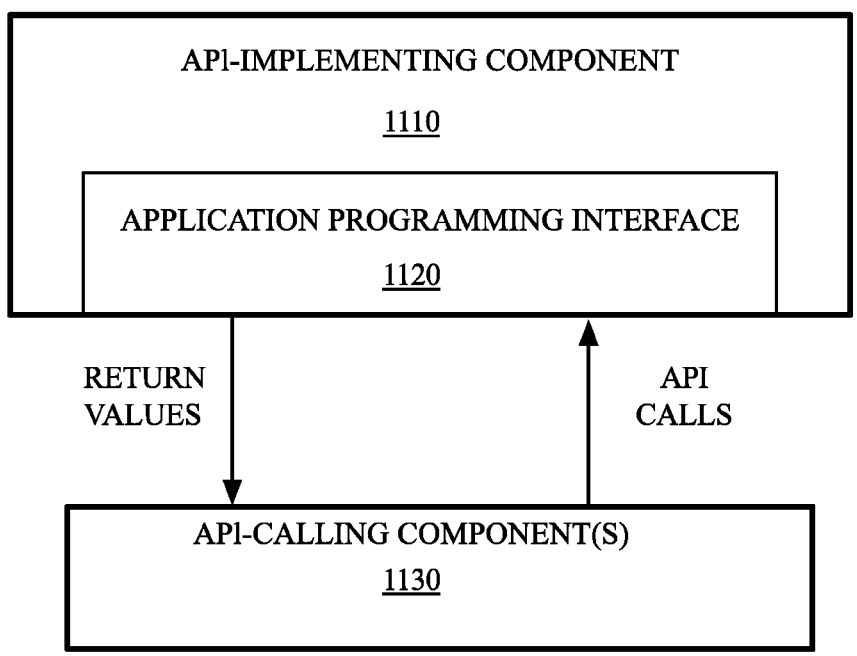
FIG. 11 is a block diagram illustrating an exemplary API architecture, which may be used in some embodiments of the invention.

FIG. 11 is a block diagram illustrating an exemplary API architecture, which may be used in some embodiments of the invention. As shown in FIG. 11, the API architecture 1100 includes the API-implementing component 1110 (e.g., an operating system, a library, a device driver, an API, an application program, software or other module) that implements the API 1120. The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 may include additional functions, methods, classes, data structures, and/or other features that are not specified through the API 1120 and are not available to the API-calling component 1130. It should be understood that the API-calling component 1130 may be on the same system as the API-implementing component 1110 or may be located remotely and accesses the API-implementing component 1110 using the API 1120 over a network. While FIG. 11 illustrates a single API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 12A:
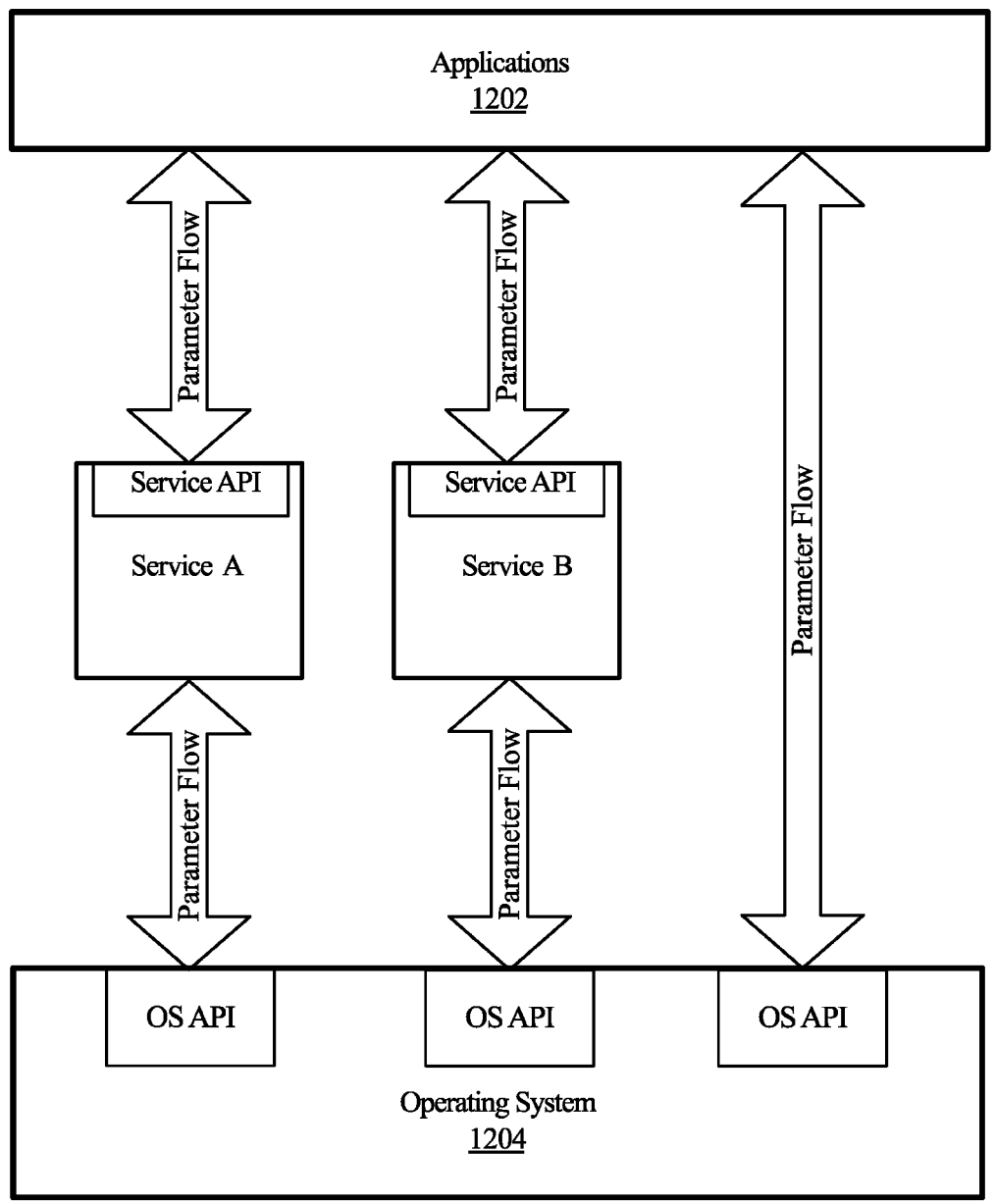
FIGS. 12A-12B are block diagrams of exemplary API software stacks, according to embodiments.
Figure 12B:
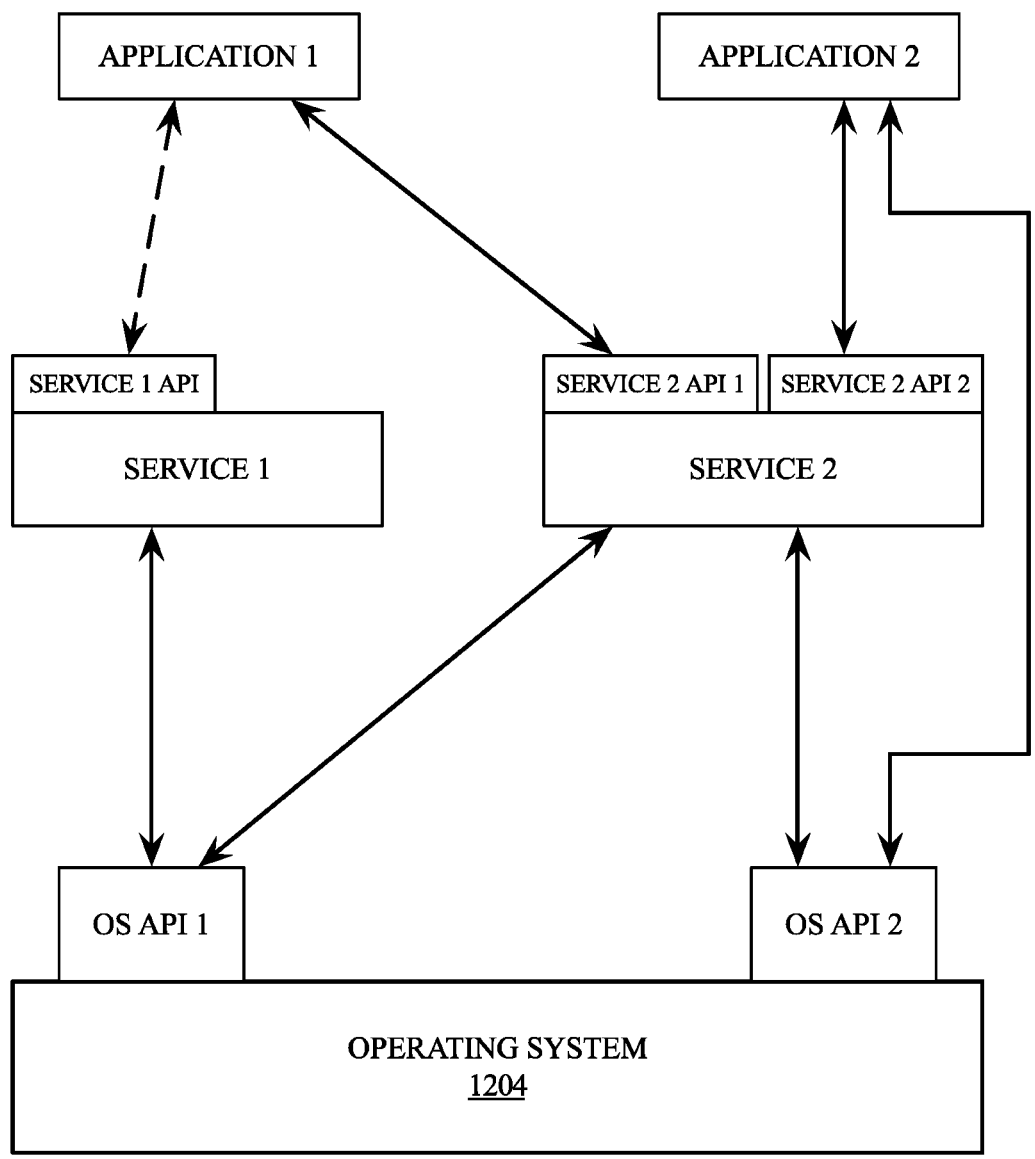

FIGS. 12A-12B are block diagrams of exemplary API software stacks 1200, 1210, according to embodiments. FIG. 12A shows an exemplary software stack 1200 in which applications 1202 can make calls to Service A or Service B using Service API and to Operating System 1204 using an OS API. Additionally, Service A and Service B can make calls to Operating System 1204 using several OS APIs.

FIG. 12B shows an exemplary software stack 1210 including Application 1, Application 2, Service 1, Service 2, and Operating System 1204. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

In various embodiments, API calls and interfaces can be used to enable operations of logic 600 of FIG. 6, logic 1000 of FIG. 10A, and logic 1020 of FIG. 10B. For example and in one embodiment, an API call (sys enabled) is provided to enable system managed encryption in which a VEK may be unwrapped using system-ID based decryption without requiring the use of a user passcode to decrypt encrypted volumes on the system. An additional API call (sys disabled) can also be provided which configures the system to require user passcode-based entropy to unwrap a VEK and allow access to encrypted storage volumes. Additional API calls are provided to create new VEK material, unwrap a VEK, or set the type of protection that is applied to a given storage volume, where different types of protection (system, user, etc.) can be applied to different storage volumes.

API calls can be used to facilitate a key creation and revocation mechanism that is provided by embodiments described herein. In one embodiment a KEK can be stored in a KEK blob, where a blob is a binary block of data. An API call (setprotection) is provided in one embodiment to bind a KEK to a VEK blob. All user records protecting the same KEK can then unlock the VEK blob to access the VEK, allowing for late binding of user records to the VEK blob in a system in which default system encryption is enabled before the creation of any user accounts. The set_protection API call can also be used to remove a KEK binding from a VEK blob, which allows for the creation and rolling of the KEK protecting a VEK. In one embodiment the set_protection API call can be used to cryptographically invalidate all previously released KEK blobs.

API calls can be used to facilitate an anti-replay mechanism that is provided by embodiments described herein. The anti-replay mechanism can be enabled by a SEP as described herein to enable non-replayable volume encryption key generation, such that an adversary having access to previously used VEK cannot reuse that encryption key once the system is transitioned to a different set of keys. For example, if a system transitions from system to user based encryption, the previous keys used during system encryption will be invalidated.

In one embodiment, the anti-replay mechanism includes two anti-replay states; a committed state and a proposed state. A VEK (or VEK blob) can be assigned one of these anti-replay states. In one embodiment, a committed VEK blob is persisted within the file system of a data processing system described herein. A proposed blob is a modified VEK blob that is waiting to be persisted. The system will consider valid the currently committed VEK and the latest proposed VEK. Intermediate proposed VEKs are considered invalid.

Figure 13:
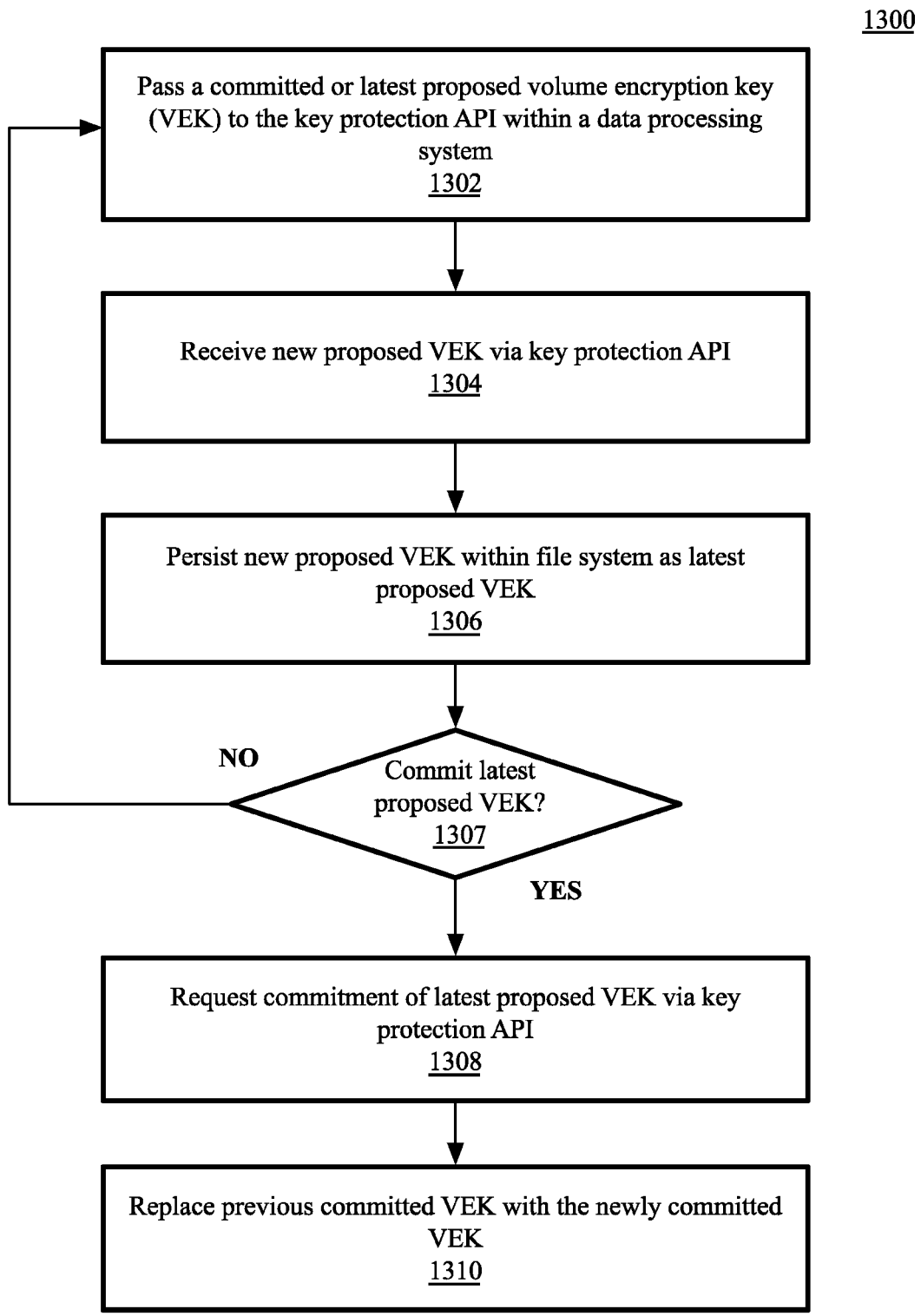
FIG. 13 illustrate operations of logic to enable non-replayable volume key modification, according to an embodiment.

FIG. 13 illustrate operations of logic 1300 to enable non-replayable volume key modification, according to an embodiment. The non-replayable key modification, in one embodiment, is enabled via a set of key protection API calls that interact with a SEP within a data processing system. In one embodiment, the key protection API calls include the setprotection API call described above. In one embodiment, the key protection API calls are callable only by the file system of a data processing system, and applications are not allowed to access such API calls. Accordingly, the logic 1300, in such embodiment, can be implemented as a portion of the file system software.

In one embodiment, as shown at block 1302, the logic 1300 can modify a protected VEK within a system by passing a committed or latest proposed VEK to the key protection API. The modifications can include binding or unbinding a KEK to the provided VEK, enabling a new KEK for a user to be used to decrypt the VEK, or removing the ability for a KEK to decrypt the VEK. If the key protection API call is performed on a proposed VEK, as determined at block 1303, the proposed VEK provided to the API call will be invalidated inside the SEP. However, if the key protection API call is performed on a committed VEK, the committed VEK will remain valid until a new VEK is committed. In any case, the call to the key protection API causes cryptographic logic (e.g., within the SEP) to output a new proposed VEK, which will be considered valid. The logic 1300 can receive the new proposed VEK at block 1304. The logic 1300 can then persist the new proposed VEK within the file system as the latest proposed VEK at block 1306. The latest proposed VEK can continue to be modified until a determination is made at block 1307 to make the latest proposed VEK become the new committed VEK. The logic 1300 can then perform a key protection API call to commit the latest proposed VEK, as shown at block 1310, which causes the SEP to cryptographically invalidate all previous VEKs. At block 1312, the logic 1300 can then replace the previous committed VEK with the newly committed VEK.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described in accordance with an embodiment.

Embodiments described herein provide for a system, method, and apparatus to enable secured passcodes and encryption on a data processing system. One embodiment provides for an apparatus comprising a first processor to receive a set of credentials associated with one of multiple user accounts on the apparatus and a second processor including a secure circuit to provide a secure enclave, the secure enclave to receive a request from the first processor to authenticate the set of credentials, the request including supplied credentials and an authentication type, where the secure enclave is to block the request from the first processor in response to a determination that the user account has exceeded a threshold number of successive failed authentication attempts for the authentication type. In one embodiment the second processor can additionally delay authentication of the request in response to a determination that the user account has exceeded a first number of successive failed authentication attempts for the authentication type.

One embodiment provides for a non-transitory machine readable medium storing instructions which, when executed on one or more processors cause the one or more processors to perform operations comprising receiving a request at a first operating system executing on a first processor of a computing device to authenticate a user account associated with a second operating system executing on a second processor of the computing device, the request including an authentication type and credentials associated with the user account; delaying authentication of the user account for a period based on a number of previous successive failed authentication attempts; sending a first message to the second operating system authenticating the user account in response to determining validity of the credentials within the request; and sending a second message to the second operating system denying authentication in response to determining invalidity of the credentials within the request.

In one embodiment, the second processor is additionally configured to delay authentication of the request for a first period in response to a determination that the user account has exceeded a first number of successive failed authentication attempts for the authentication type, where the first number of successive failed authentication attempts is less than the threshold number of failed authentication attempts. The second processor can also delay the authentication of the request for a second period in response to a determination that the user account has exceeded a second number of successive failed authentication attempts for the authentication type, where first number of successive failed authentication attempts is less than the second number of failed authentication attempts. The second processor can also delay authentication of a first request in response to a determination that the user account has exceeded a first number of successive failed authentication attempts for a first authentication type, while performing authentication of a second request in response to a determination that the user account has not exceeded a first number of successive failed authentication attempts for a second authentication type. In one embodiment the first authentication type is a console login, while the second authentication type is a remote login, remote storage access attempt, or remote command line access attempt.

In one embodiment the secure circuit of the second processor includes memory to store authentication failure metrics. The authentication failure metrics track a number of successive failed authentication attempts for the first authentication type and the second authentication type. In one embodiment the secure circuit of the second processor includes memory to store authentication failure metrics associated with three or more authentication types.

One embodiment provides for a method of account authentication on a multi-user computing device, the method comprising receiving a request at a first operating system executing on a first processor of a computing device to authenticate a user account associated with a second operating system executing on a second processor of the computing device, the request including an authentication type and credentials associated with the user account; delaying authentication of the user account for a period based on a number of previous successive failed authentication attempts; sending a first message to the second operating system authenticating the user account in response to determining validity of the credentials within the request; and sending a second message to the second operating system denying authentication in response to determining invalidity of the credentials within the request.

One embodiment provides for a data processing system comprising a first set of processors to execute a first set of instructions, the first set of instructions to cause the first set of processors to provide a first operating system, the first operating system having multiple user accounts and a second set of processors to execute a first set of instructions, the second set of processors including a secure enclave processor, the secure enclave processor to provide an authentication verifier for the multiple user accounts of the first operating system and block authentication of a user account after the user account exceeds a threshold number of successive failed authentication attempts for an authentication type.

In one embodiment, the authentication verifier for the multiple user accounts is bound to the secure enclave processor, such that the authentication verifiers are configured to be functional only with the specifically bound SEP. The authentication system within the data processing is non-functional if those authentication verifiers are brought offline, bypassed, or disabled. In one embodiment, the secure enclave processor includes memory to store authentication failure metrics to track a number of successive failed authentication attempts for multiple authentication types. The secure enclave processor can store authentication failure metrics to track a number of successive failed authentication attempts for each of the multiple user accounts.

One embodiment provides for a computing device comprising a first processor to execute a first operating system having one or more user accounts; a second processor to execute a second operating system, the second processor including a secure enclave, the secure enclave to receive a first encrypted key from the first processor and decrypt a volume encryption key via a key encryption key derived from the first encrypted key, the first encrypted key derived via the secure enclave without user-provided entropy; and a non-volatile memory controller to access encrypted data within non-volatile memory using the volume encryption key.

In one embodiment the volume encryption key can be received from the second processor via an encrypted connection established via a secret key shared by the non-volatile memory controller and the secure enclave. The secure enclave can derive one or more derived encryption keys based on the first encrypted key, the one or more derived encryption keys to decrypt the key encryption key. In one embodiment the secure enclave includes an entropy generator that can generate first system entropy and derive the first encrypted key based on the first system entropy. In one embodiment the first operating system can receive a request to transition storage encryption from system entropy encryption to user entropy encryption and, in response to the request, can generate a set of keys based on user entropy derived from user credentials.

In one embodiment the first operating system can request the second operating system to cryptographically invalidate the first encrypted key, which can be performed via the secure enclave. To cryptographically invalidate the first encrypted key, the secure enclave can generate a second system entropy and generate a second system key based on the second system entropy. The second system entropy, in one embodiment, is generated via the second system entropy and a root key. The root key can be generated via a root entropy and an at least quasi-unique identifier associated with the computing device. In one embodiment the at least quasi-unique identifier associated with the computing device is stored within the secure enclave.

One embodiment provides for a non-transitory machine-readable medium storing instructions to cause one or more processors to perform operations including generating a volume encryption key within a secure enclave processor, the volume encryption key to enable access to data on a storage volume of a data processing system; encrypting the volume encryption key within the secure enclave processor, the volume encryption key encrypted using a first encryption key; generating first system entropy data within the secure enclave processor; generating a second encryption key based on the first system entropy data, the second encryption key to enable access to the first encryption key; and requesting storage of an encrypted second encryption key within a storage device on the data processing system, the encrypted second encryption key to enable access to the volume encryption key by a user account without use of entropy associated with credentials of the user account.

In one embodiment the operations additionally include encrypting the second encryption key within the secure enclave processor to generate the encrypted second encryption key. The second encryption key can be generated using a device specific key associated with the data processing system. The device specific key can be stored within the secure enclave processor. In one embodiment the operations additionally include receiving a request to enable user entropy based storage encryption; invalidating the second encryption key; generating a third encryption key based on one or more credentials of the user account; and requesting storage of an encrypted third encryption key within the storage device on the data processing system, the encrypted third encryption key to enable access to the volume encryption key by the user account. In one embodiment the operations additionally include encrypting the encrypted third encryption key within the secure enclave processor using a device specific key associated with the data processing system, the device specific key stored within the secure enclave processor.

One embodiment provides for a data processing system comprising a first set of processors to execute a first set of instructions, the first set of instructions to cause the first set of processors to provide a first operating system, the first operating system having multiple user accounts; a second set of processors to execute a second set of instructions, the second set of processors including a secure enclave processor, the secure enclave processor to receive a first encrypted key from the first set of processors and decrypt a volume encryption key via a key encryption key derived from the first encrypted key, the first encrypted key derived via the secure enclave processor without user-provided entropy; and a non-volatile memory controller to access encrypted data within non-volatile memory using the volume encryption key.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A computing device comprising:
a first processor to execute a first operating system having one or more user accounts;
a second processor to execute a second operating system, the second processor to:
receive a first encrypted key from the first processor, the first encrypted key derived and encrypted via the second processor without user-provided entropy and transmitted to the first operating system on the first processor;
decrypt the first encrypted key into a decrypted first encryption key;
derive a key encryption key via the decrypted first encrypted key;
decrypt a volume encryption key via the key encryption key; and a non-volatile memory controller to access encrypted data within non-volatile memory using the volume encryption key.

2. The computing device as in claim 1, wherein the volume encryption key is to be received from the second processor via an encrypted connection established via a secret key shared by the non-volatile memory controller and the second processor.

3. The computing device as in claim 1, wherein the second processor is to derive one or more derived encryption keys based on the first encrypted key, the one or more derived encryption keys to decrypt the key encryption key.

4. The computing device as in claim 1, the second processor including an entropy generator to generate first system entropy and derive the first encrypted key based on the first system entropy.

5. The computing device as in claim 4, the first operating system to receive a request to transition storage encryption from system entropy encryption to user entropy encryption and, in response to the request, generate a set of keys based on user entropy derived from user credentials.

6. The computing device as in claim 5, the first operating system to request the second operating system to cryptographically invalidate the first encrypted key.

7. The computing device as in claim 6, the second operating system to cryptographically invalidate the first encryption key via the second processor.

8. The computing device as in claim 7, wherein the second processor, to cryptographically invalidate the first encrypted key, is to generate a second system entropy and generate a second system key based on the second system entropy.

9. The computing device as in claim 8, the second processor to generate the second system key based on the second system entropy and a root key, the root key generated via a root entropy and an at least quasi-unique identifier associated with the computing device.

10. The computing device as in claim 9, wherein the at least quasi-unique identifier associated with the computing device is stored within the second processor.

11. A non-transitory machine-readable medium storing instructions to cause one or more processors to perform operations including:
first and second processor and first and second operating system;
generating, via a second operating system on a second processor, a volume encryption key within the second processor, the volume encryption key to enable access to data on a storage volume of a data processing system including the second processor and a first processor;
encrypting the volume encryption key within the second processor, the volume encryption key encrypted using a first encryption key;
generating first system entropy data within the second processor;
generating a second encryption key based on the first system entropy data, the second encryption key to enable access to the first encryption key; and
requesting a first operating system on the first processor to store an encrypted second encryption key within a storage device on the data processing system, the encrypted second encryption key to enable access to the volume encryption key by a user account without use of entropy associated with credentials of the user account.

12. The non-transitory machine-readable medium as in claim 11, the operations additionally including encrypting the second encryption key within the second processor to generate the encrypted second encryption key.

13. The non-transitory machine-readable medium as in claim 12, the operations additionally including encrypting the second encryption key within the second processor using a device specific key associated with the data processing system.

14. The non-transitory machine-readable medium as in claim 13, wherein the device specific key is stored within the second processor.

15. The non-transitory machine-readable medium as in claim 11, the operations additionally including:
receiving a request to enable user entropy based storage encryption;
invalidating the second encryption key;
generating a third encryption key based on one or more credentials of the user account; and
requesting storage of an encrypted third encryption key within the storage device on the data processing system, the encrypted third encryption key to enable access to the volume encryption key by the user account.

16. The non-transitory machine-readable medium as in claim 15, the operations additionally including encrypting the encrypted third encryption key within the second processor using a device specific key associated with the data processing system, the device specific key stored within the second processor.

17. A data processing system comprising:
a first set of processors to execute a first set of instructions, the first set of instructions to cause the first set of processors to provide a first operating system, the first operating system having multiple user accounts;
a second set of processors to execute a second set of instructions, the second set of processors including a secure processor, the secure processor to receive a first encrypted key from a processor in the first set of processors and decrypt a volume encryption key via a key encryption key derived from the first encrypted key, the first encrypted key derived and encrypted via the secure processor without user-provided entropy and provided to the first operating system of the first set of processors by the secure processor; and
a non-volatile memory controller to access encrypted data within non-volatile memory using the volume encryption key.

18. The data processing system as in claim 17, wherein the volume encryption key is to be received from the secure processor in the second set of processors via an encrypted connection established via a secret key shared by the non-volatile memory controller and the secure processor.

19. The data processing system as in claim 17, wherein the secure processor is to derive one or more derived encryption keys based on the first encrypted key, the one or more derived encryption keys to decrypt the key encryption key.

20. The data processing system as in claim 19, the secure processor including an entropy generator to generate first system entropy and derive the first encrypted key based on the first system entropy.

* * * * *